United States Patent
Nakashima et al.

(10) Patent No.: US 10,026,197 B2
(45) Date of Patent: Jul. 17, 2018

(54) SIGNAL PROCESSING METHOD, SIGNAL PROCESSING APPARATUS, AND STORAGE MEDIUM

(71) Applicant: CANON KABUSHIKI KAISHA, Tokyo (JP)

(72) Inventors: Daisuke Nakashima, Kawasaki (JP); Hiroshi Sato, Kawasaki (JP); Shunsuke Nakano, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 132 days.

(21) Appl. No.: 13/961,540

(22) Filed: Aug. 7, 2013

(65) Prior Publication Data

US 2014/0056509 A1    Feb. 27, 2014

(30) Foreign Application Priority Data

Aug. 22, 2012  (JP) ................. 2012-183587

(51) Int. Cl.
*G06K 9/00* (2006.01)
*G06T 9/00* (2006.01)
(Continued)

(52) U.S. Cl.
CPC ............ *G06T 9/00* (2013.01); *G06K 9/00268* (2013.01); *G06K 9/00281* (2013.01);
(Continued)

(58) Field of Classification Search
CPC ............ G06K 9/00597; G06K 9/0061; G06K 9/00369; G06K 9/00281; G06K 9/46;
(Continued)

(56) References Cited

U.S. PATENT DOCUMENTS

| 5,383,144 A | * | 1/1995 | Kato | G06F 17/17 |
| | | | | 708/313 |
| 5,731,840 A | * | 3/1998 | Kikuchi | H04N 7/52 |
| | | | | 375/240.02 |

(Continued)

FOREIGN PATENT DOCUMENTS

JP     08-329031 A     12/1996
JP     3831232 B       10/2006

OTHER PUBLICATIONS

Li et al., Optimum Gabor Filter Design and Local Binary Patterns for Texture Segmentation, Apr. 1, 2008 [retrieved Nov. 30, 2015], Pattern Recognition Letters, vol. 29, Issue 5, pp. 664-672. Retrieved from the Internet: http://www.sciencedirect.com/science/article/pii/S016786550700390X.*

(Continued)

*Primary Examiner* — Matthew Bella
*Assistant Examiner* — Dennis Rosario
(74) *Attorney, Agent, or Firm* — Fitzpatrick, Cella, Harper & Scinto

(57) ABSTRACT

There is provided with a signal processing method. A filtering result is generated by performing spatial filtering on multi-dimensional data. Encoding result data is output by encoding the filtering result using a value at a pixel of interest of the filtering result and a value at a reference pixel located at a relative position with respect to the pixel of interest. The relative position of the reference pixel is decided in advance according to a characteristic of a spatial filter used in the spatial filtering step.

20 Claims, 13 Drawing Sheets

(51) Int. Cl.
*H04N 19/105* (2014.01)
*H04N 19/176* (2014.01)
*H04N 19/593* (2014.01)
*H04N 19/117* (2014.01)
*H04N 19/136* (2014.01)
*H04N 19/182* (2014.01)
*H04N 19/80* (2014.01)
*H04N 19/85* (2014.01)
*H04N 19/20* (2014.01)

(52) U.S. Cl.
CPC ........... *G06T 9/001* (2013.01); *H04N 19/105* (2014.11); *H04N 19/117* (2014.11); *H04N 19/136* (2014.11); *H04N 19/176* (2014.11); *H04N 19/182* (2014.11); *H04N 19/593* (2014.11); *H04N 19/80* (2014.11); *H04N 19/85* (2014.11); *H04N 19/20* (2014.11)

(58) Field of Classification Search
CPC ............. G06K 9/4671; G06K 9/00288; G06K 9/00302; G06K 2009/4666; G06K 9/00268; G06K 9/00248; H04N 5/23219; G06T 7/0012; G06T 7/11; G06T 2207/30201; G06F 17/30247
See application file for complete search history.

(56) References Cited

U.S. PATENT DOCUMENTS

| | | | |
|---|---|---|---|
| 5,760,346 A | 6/1998 | Kobayashi et al. | |
| 5,761,087 A | 6/1998 | Yoshimura et al. | |
| 5,862,049 A | 1/1999 | Sato et al. | |
| 6,225,986 B1 | 5/2001 | Sato et al. | |
| 6,239,792 B1 | 5/2001 | Yanagisawa et al. | |
| 6,288,711 B1 | 9/2001 | Tanaka et al. | |
| 6,611,258 B1 | 8/2003 | Tanaka et al. | |
| 7,881,524 B2 | 2/2011 | Matsugu et al. | |
| 8,072,541 B2* | 12/2011 | Nakagawa | H04N 9/642 348/453 |
| 8,285,079 B2* | 10/2012 | Robertson | G06T 7/204 382/294 |
| 8,331,655 B2 | 12/2012 | Sato et al. | |
| 8,527,439 B2 | 9/2013 | Torii et al. | |
| 2008/0075165 A1* | 3/2008 | Ugur | H04N 19/139 375/240.12 |
| 2011/0158540 A1 | 6/2011 | Suzuki et al. | |
| 2011/0179052 A1 | 7/2011 | Sato | |
| 2011/0249750 A1* | 10/2011 | Fuchikami | H04N 7/0127 375/240.16 |
| 2012/0051646 A1 | 3/2012 | Suzuki et al. | |
| 2012/0195378 A1* | 8/2012 | Zheng et al. | 375/240.12 |
| 2012/0218432 A1* | 8/2012 | Liu et al. | 348/222.1 |

OTHER PUBLICATIONS

Murala et al., Local Tetra Patterns: A New Feature Descriptor for Content-Based Image Retrieval, May 2012 [retrieved Feb. 25, 2016], IEEE Transactions on Image Processing, vol. 21, Issue:5, pp. 2874-2886. Retrieved from the Internet: http://ieeexplore.ieee.org/xpls/abs_all.jsp?arnumber=6175124&tag=1.*

Shojaeilangari et al., Person Independent Facial Expression Analysis using Gabor Features and Genetic Algorithm, Dec. 13-16, 2011 [retrieved Jul. 14, 2017], 8th International Conference on Information, Communications and Signal Processing 2011, 5 total pages. Retrieved from the Internet: http://ieeexplore.ieee.org/abstract/document/6173537/.*

Gao et al., A Novel Face Decription by Multi-Channel Gabor Histogram Sequence Binary Pattern, Jul. 7-9, 2008 [retrieved Jul. 14, 2017], 2008 International Conference on Audio, Language and Image Processing, pp. 1240-1244. Retrieved from the Internet: http://ieeexplore.ieee.org/abstract/document/4590128/.*

Nguyen et al., Local Gabor Binary Pattern Whitened PCA: A Novel Approach for Face Recognition from Single Image Per Person, Jun. 2-5, 2009 [retrieved Oct. 23, 2017], International Conference on Biometircs 2009: Advances in Biometrics, pp. 269-278. Retrieved from the Internet: https://link.springer.com/chapter/10.1007/978-3-642-01793-3_28.*

Zou et al., A Comparative Study of Local Matching Approach for Face Recognition, Sep. 17, 2007[retrieved Mar. 23, 2018], IEEE Transactions on Image Processing, vol. 16, Issue: 10, pp. 2617-2628. Retrieved from the Internet: http://ieeexplore.ieee.org/abstract/document/4303157/.*

T. Ojala et al., "A Comparative Study of Texture Measures with Classification Based on Feature Distributions", Pattern Recognition, vol. 29, 51-59, 1996.

W. Zhang et al., "Local Gabor Binary Pattern Histogram Sequence (LGBPHS): A Novel Non-Statistical Model for Face Representation and Recognition", Proc. IEEE International Conference on Computer Vision, pp. 768-791, 2005.

I. Murase et al., "Picture Matching by Increment Sign Correlation", IEICE Transactions D-II, vol. J83-D-II, No. 5, pp. 1323-1331, 2000.

T. Ojala et al., "A Comparative Study of Texture Measures with Classification Based on Featured Distributions", Pattern Recognition, vol. 29, 51-59, 1996.

* cited by examiner

FIG. 8
| SPATIAL FILTER NUMBER | RELATIVE POSITION OF REFERENCE PIXEL | |
|---|---|---|
| | $x_k$ | $y_k$ |
| 0 | 1 | 0 |
| 1 | −1 | −1 |
| 2 | 0 | −1 |
| 3 | 1 | −1 |
FIG. 9
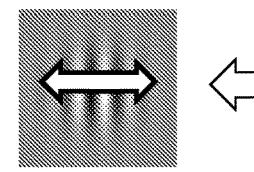 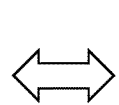 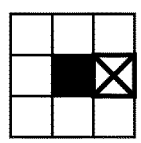
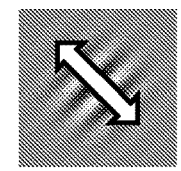 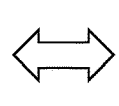 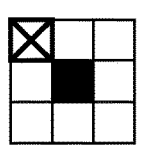
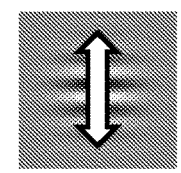 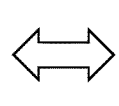 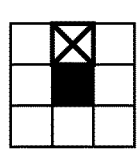
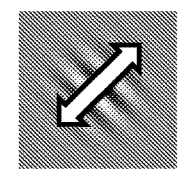 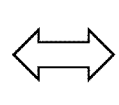 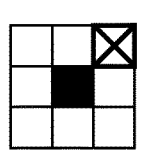
■ : PIXEL OF INTEREST
⊠ : REFERENCE PIXEL

SIGNAL PROCESSING METHOD, SIGNAL PROCESSING APPARATUS, AND STORAGE MEDIUM

BACKGROUND OF THE INVENTION

Field of the Invention

The disclosure relates to a signal processing method and signal processing apparatus and, more particularly, to a technique for extracting a feature amount suited to pattern identification from multi-dimensional data such as image data.

Description of the Related Art

As a feature amount effective for pattern identification such as face recognition, an LGBP (Local Gabor Binary Pattern) described in W. Zhang, S. Shan, W. Gao, X. Chen, H. Zhang, "Local Gabor Binary Pattern Histogram Sequence (LGBPHS): A Novel Non-Statistical Model for Face Representation and Recognition", Proc. IEEE International Conference on Computer Vision, pp. 768-791, 2005. has been proposed. The LGBP is a feature amount obtained by applying several ten Gabor Wavelet filters to input image data, and extracting, from image data after the filtering, an LBP (Local Binary Pattern) described in T. Ojala, M. Pietikainen, D. Harwood, "A Comparative Study of Texture Measures with Classification Based on Featured Distributions", Pattern Recognition, Vol. 29, 51-59, 1996.

FIG. 14 shows overview of processing required to extract an LBP. The LBP is an 8-bit feature amount calculated based on a pixel of interest (x, y) and eight pixels (to be referred to as reference pixels $(x+x_n, y+y_n)$ hereinafter) which neighbor the pixel of interest, as given by:

$$LBP(x, y) = \sum_{n=0}^{7} s(i(x + x_n, y + y_n) - i(x, y)) \cdot 2^n \quad (1)$$

where i(x, y): an input pixel value at coordinates (x, y),
LBP (x, y): an LBP at the coordinates (x, y), and
$(x_n, y_n)$: relative positions of the reference pixels with respect to the pixel of interest,
and $$s(u) = \begin{cases} 1 & \text{if } u \geq th \\ 0 & \text{if } u < th \end{cases} \quad (2)$$

Note that in the example of FIG. 14, a threshold th=0. Also, assuming that a pixel immediately above the pixel of interest is set to be $(x_0, y_0)=(0, 1)$, the relative positions $(x_n, y_n)$ are set to be $(x_1, y_1)=(1, 1), (x_2, y_2)=(1, 0), \ldots, (x_7, y_7)=(-1, 1)$ so as to surround the pixel of interest clockwise.

As described above, the LGBP is popularly used in face recognition and the like as a feature amount effective for pattern identification, but several ten Gabor Wavelet filters are required to be used so as to obtain high identification accuracy. For example, when 40 Gabor Wavelet filters are used, a data amount of the LGBP generated as a result of the processing is "output data size×40×8 bits". For example, upon calculating the data amount to have an output data size=64×64, the data amount of the LGBP is about 1.3 Mbits. That is, in case of the LGBP, especially when pattern identification is implemented as hardware, a cost of the overall apparatus increases.

SUMMARY OF THE INVENTION

The embodiments can attain both improvement of identification accuracy and a reduction of a data amount of pattern identification upon extracting a feature amount suited to pattern identification from multi-dimensional data.

According to one embodiment of the present invention, a signal processing method comprises: a spatial filtering step of generating a filtering result by performing spatial filtering on multi-dimensional data; and an encoding step of outputting encoding result data by encoding the filtering result using a value at a pixel of interest of the filtering result and a value at a reference pixel located at a relative position with respect to the pixel of interest, wherein the relative position of the reference pixel is decided in advance according to a characteristic of a spatial filter used in the spatial filtering step.

According to another embodiment of the present invention, a signal processing apparatus comprises: an acquisition unit configured to acquire data; a spatial filtering unit configured to output a filtering result by performing spatial filtering on multi-dimensional data acquired by the acquisition unit; and an encoding unit configured to output encoding result data by encoding the filtering result using a value at a pixel of interest of the filtering result and a value at a reference pixel located at a relative position, wherein the relative position of the reference pixel is decided in advance according to a characteristic of a spatial filter used by the spatial filtering unit.

According to still another embodiment of the present invention, a non-transitory computer-readable storage medium stores a program to instruct a computer to perform: a spatial filtering step of generating a filtering result by performing spatial filtering on multi-dimensional data; and an encoding step of outputting encoding result data by encoding the filtering result using a value at a pixel of interest of the filtering result and a value at a reference pixel located at a relative position with respect to the pixel of interest, wherein the relative position of the reference pixel is decided in advance according to a characteristic of a spatial filter used in the spatial filtering step.

Further features of the present invention will become apparent from the following description of exemplary embodiments (with reference to the attached drawings).

BRIEF DESCRIPTION OF THE DRAWINGS

FIG. 8 is a view showing an example of a correspondence table of spatial filter numbers and relative positions of reference pixels with respect to a pixel of interest;

FIG. 9 is a view for explaining the relationship between spatial filters and relative positions of reference pixels with respect to a pixel of interest;

DESCRIPTION OF THE EMBODIMENTS

Figure 15:
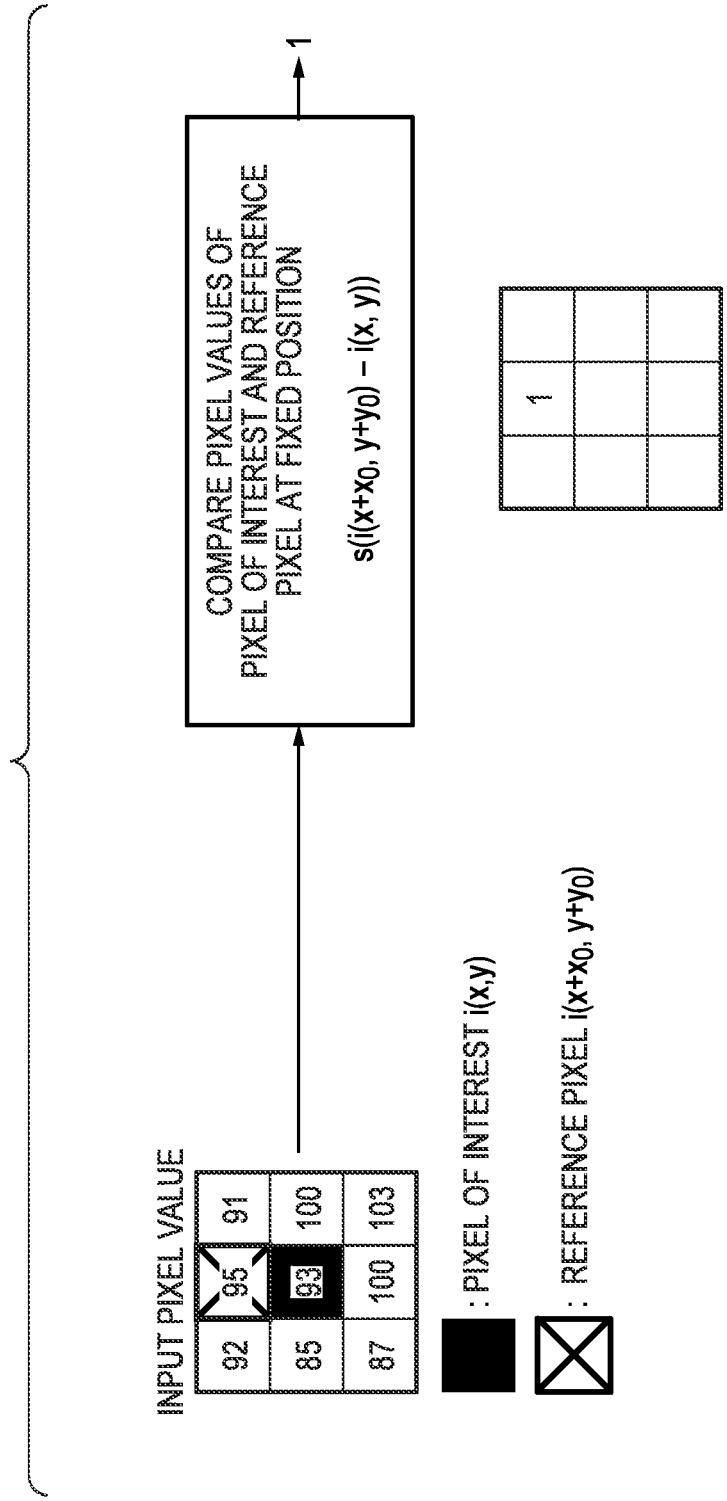
FIG. 15 is a view for explaining processing for extracting an increment sign from an input pixel value.

As a feature amount similar to an LBP, an increment sign described in Ichiro Murase, Shunichi Kaneko, and Satoru Igarashi, "Picture Matching By Increment Sign Correlation", IEICE Transactions D-II, Vol. J83-D-II, No. 5, pp. 1323-1331, 2000. is known. FIG. 15 shows an overview of incremental encoding processing. An increment sign at coordinates (x, y) is calculated by:

$$IS(x,y)=s(i(x+x_0,y+y_0)-i(x,y)) \quad (3)$$

where IS(x, y): an increment sign at the coordinates (x, y).

As can be seen from comparison between equations (1) and (3), an increment sign is an LBP using only a reference pixel of n=0. Note that known incremental encoding processing uses a pixel at an identical relative position as a reference pixel for all input image data. In the example shown in FIG. 15, a pixel having a relative position $(x_0, y_0)=(0, 1)$ with respect to a pixel of interest is used as a reference pixel.

In order to reduce a data amount of an LGBP, incremental encoding processing may be used in place of extracting an LBP from image data after Gabor Wavelet filtering. This is because in case of an increment sign, a data amount can be reduced to ⅛ compared to that of an LBP.

However, in case of an increment sign, since a data amount is smaller than that of an LBP, identification accuracy of pattern identification may lower.

Figure 16:
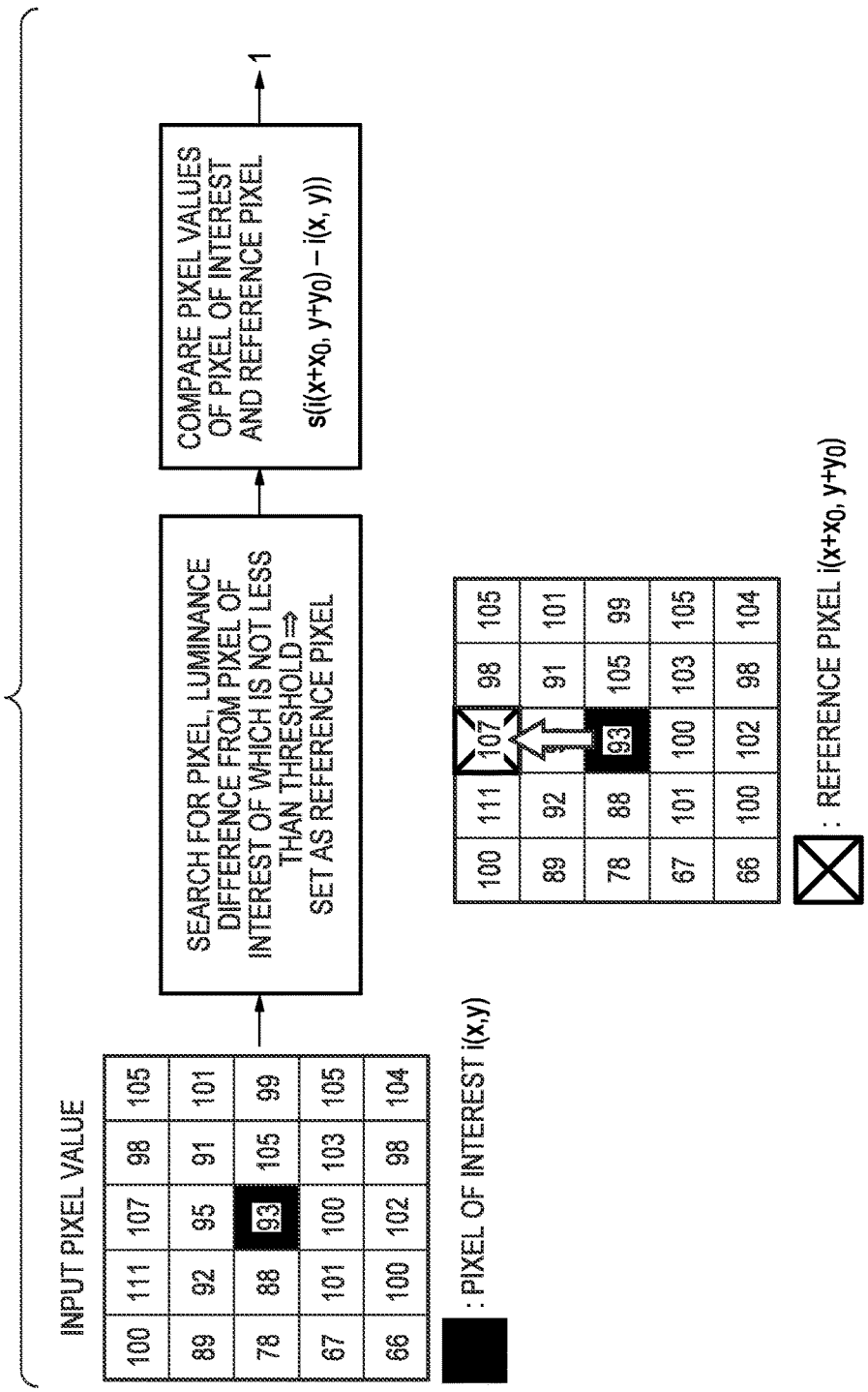
FIG. 16 is a view for explaining processing for encoding an input pixel value by a method described in patent literature 1.

Furthermore, Japanese Patent No. 3831232 has proposed a method of dynamically deciding a relative position of a reference pixel based on a pixel value difference from a pixel of interest (that is, according to contents of input image data) in place of using a fixed relative position of a reference pixel. FIG. 16 shows an overview of a method described in patent literature 1. FIG. 16 shows an example when a search direction is an upper direction, and a threshold th=10.

With the method described in Japanese Patent No. 3831232, a pixel having a pixel value difference from a pixel of interest, which is larger than the threshold, is searched in turn from pixels closer to the pixel of interest along a predetermined direction from the pixel of interest, and a pixel which satisfies that condition and appears first is selected as a reference pixel. Furthermore, a pixel value difference between the reference pixel and pixel of interest is encoded by the same processing as in equation (3) to be used as a feature amount. In this manner, with the method described in Japanese Patent No. 3831232, since a relative position between the pixel of interest and reference pixel is decided according to the contents of input image data, the relative position of the reference pixel with respect to the pixel of interest can be interpreted as a part of a feature amount extracted from input image data.

As in Japanese Patent No. 3831232 above, a method of deciding a relative position of a reference pixel with respect to a pixel of interest according to contents of input image data and executing incremental encoding processing using the decided reference pixel and pixel of interest may be used.

However, in case of face recognition, a relative position of a reference pixel is different for each registered data used in collation, and for each feature point of a face to be extracted. For this reason, information indicating relative positions of reference pixels with respect to pixels of interest for all feature points of a face for each registered data is required to be held, and a data amount of each registered data becomes large. Also, a data amount used upon collation with each individual registered data is increased by an amount of the information indicating the relative positions. This brings about disadvantages such as a long processing time and an increase in circuit scale especially when face recognition is implemented by hardware.

According to the embodiments, both improvement of identification accuracy of pattern identification and a data amount reduction can be achieved upon extracting a feature amount suited to pattern identification from multi-dimensional data.

More specifically, a feature amount obtained by executing encoding processing after application of spatial filters such as Gabor Wavelet filters having biased frequency responses to input image data can be represented well to have lower dimensions than the conventional feature amount.

Respective embodiments will be described in detail hereinafter with reference to the drawings. Note that the following embodiment will explain application examples of a signal processing method according to the embodiments to feature amount extraction processing in pattern identification. Also, the following embodiments will explain a case in which two-dimensional image data is used as an example of multi-dimensional data.

First Embodiment

<1. Arrangement Example of Signal Processing Apparatus>

Figure 1:
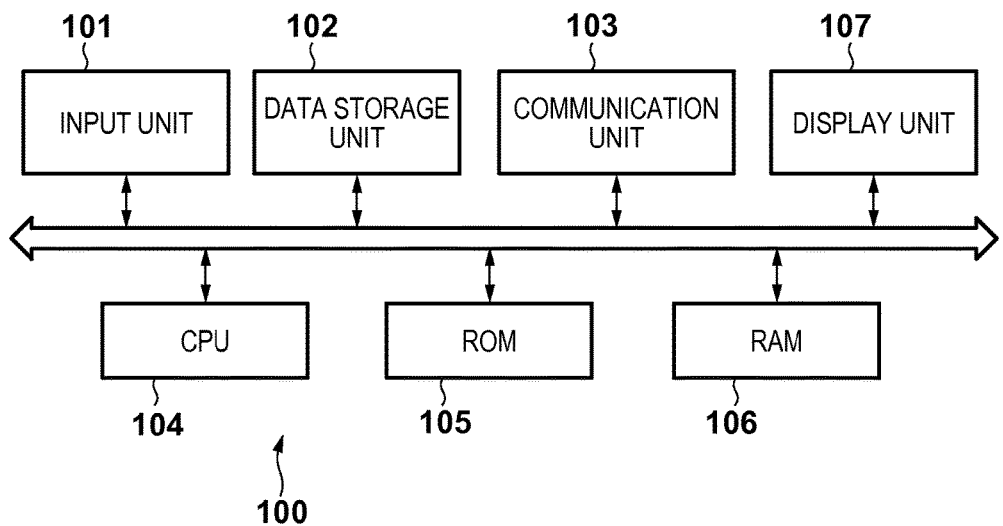
FIG. 1 is a block diagram showing an example of the arrangement of a signal processing apparatus according to the first embodiment.

FIG. 1 is a block diagram showing an example of the arrangement of a signal processing apparatus 100 which can implement a signal processing method according to the first embodiment of the present invention.

A data storage unit 102 has a function of holding image data. Note that the data storage unit 102 can store programs and other data in addition to image data.

Normally, the data storage unit 102 includes a hard disk, flexible disk, CD-ROM, CD-R, DVD, memory card, CF card, smart media, SD card, memory stick, xD picture card, USB memory, and the like. Note that a part of a RAM 106 (to be described later) may be used as the data storage unit 102. Alternatively, a storage device of an external apparatus connected via a communication unit 103 (to be described later) may be used as the data storage unit 102 via the communication unit 103.

A display unit 107 is a device which displays image data before or after pattern identification processing or displays image data such as a GUI, and a CRT, liquid crystal display, or the like is normally used. Note that an external display device connected via a cable or the like may be used as the display unit 107.

An input unit 101 is a device which receives a user instruction and various data, and includes a keyboard and pointing device. Note that the pointing device includes a mouse, track ball, track pad, tablet, and the like. Alternatively, when the signal processing apparatus 100 is applied to a known apparatus such as a digital camera or printer, the input unit 101 may include buttons, dials, and the like. Alternatively, the input unit 101 may have a configuration in which the keyboard is configured by software (as a software keyboard), and characters are input by operating buttons, dials, or the pointing device described above.

Also, the display unit 107 and input unit 101 may be configured as a single device like a known touch screen device. In this case, an input via the touch screen device is handled as that of the input unit 101.

A CPU 104 executes programs required to implement the signal processing method according to this embodiment, and controls the overall operations of the signal processing apparatus 100. A ROM 105 and the RAM 106 provide the programs required to implement the signal processing method according to this embodiment, data, a work area, and the like to the CPU 104. When the programs are stored in the data storage unit 102, ROM 105, or the like, they are temporarily loaded onto the RAM 106 and are then executed. When the signal processing apparatus 100 receives programs from an external apparatus via the communication unit 103, they are temporarily recorded in the data storage unit 102 and are then loaded onto the RAM 106 or are directly loaded onto the RAM 106 from the communication unit 103 and are executed.

A pattern identification result processed by the CPU 104 is stored in the RAM 106 or is transmitted to an external apparatus via the communication unit 103.

Note that the example of FIG. 1 shows the case of one CPU (CPU 104). However, the embodiments are not limited to this, and a plurality of CPUs may be used.

The communication unit 103 is an I/F required to make communications with an external apparatus. The communication unit 103 may include, for example, a wired communication system such as a known local area network, USB, IEEE1284, IEEE1394, or telephone line. Alternatively, the communication unit 103 may include a wireless communication system such as an infrared ray (IrDA), IEEE802.11a, IEEE802.11b, IEEE802.11g, IEEE802.11n, Bluetooth®, or UWB (Ultra Wide Band).

Note that FIG. 1 shows the arrangement in which all of the input unit 101, data storage unit 102, and display unit 107 are accommodated in one apparatus. However, the embodiments are not limited to this. For example, the respective units need not be accommodated in one apparatus as long as they are connected via a communication path based on a known communication method, and built the aforementioned arrangement as a whole.

The system arrangement includes various other components in addition to the aforementioned units, but these components are not the gist of the present invention, and a description thereof will not be given.

<2. Overview of Pattern Identification Processing>

Figure 2:
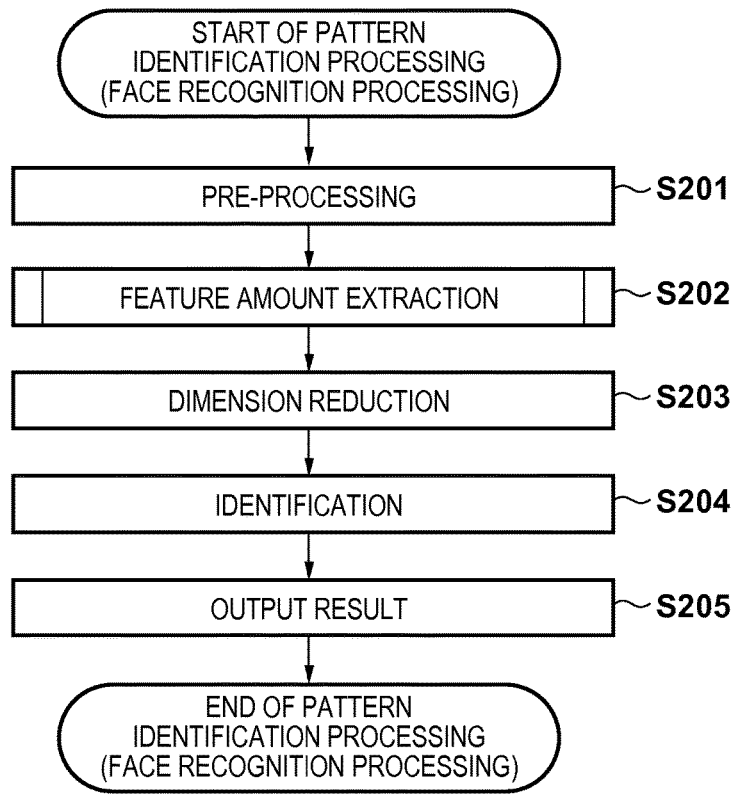
FIG. 2 is a flowchart showing pattern identification processing in the signal processing apparatus.

Pattern identification processing will be described below with reference to FIG. 2. FIG. 2 is a flowchart showing the overall sequence of pattern identification processing which includes the signal processing method according to embodiments, and is processed by the CPU 104. In this embodiment, face recognition processing will be exemplified below as the pattern identification processing. Note that the face recognition processing is processing for specifying a person by comparing feature amounts extracted from input face image data and registered data, which are generated in advance. This embodiment will exemplify a case in which the signal processing method according to this embodiment is applied to feature amount extraction processing in the face recognition processing. However, the signal processing method according to this embodiment is applicable to feature amount extraction processing in other pattern identification processes.

Assume that each face image data to be used is generated according to the following sequence and is stored in the RAM 106 prior to the face recognition processing. Initially, image data stored in the data storage unit 102 is stored in the RAM 106. Next, the image data stored in the RAM 106 is converted into 8-bit unsigned luminance image data. Then, a face region is extracted by a known face detection method, and is resized to a predetermined size, thus generating face image data and storing the face image data in the RAM 106. At this time, as information used to display a result of the face recognition processing, position/size information of the detected face region in source image data is stored in the RAM 106 in association with the generated face image data. Note that the face image data generation sequence is not limited to this, and a result of processing executed by an external apparatus may be stored in the RAM 106 via the communication unit 103.

In step S201, the CPU 104 executes pre-processing for face image data stored in the RAM 106. More specifically, the CPU 104 detects face organ positions of eyes, a nose, mouth, and the like using a known Active Appearance Model, Active Shape Model, or the like. Furthermore, the CPU 104 converts (normalizes) the face image data so that the two eyes are arranged horizontally and have a predetermined size based on the detected organ positions.

In step S202, the CPU 104 extracts feature amounts effective for face recognition from the pre-processed face image data. Note that feature amount extraction processing in step S202 will be described later.

In step S203, the CPU 104 reduces the number of dimensions of the feature amounts. This is to reduce a computation amount in the subsequent processes by reducing the number of dimensions so as to extract only information effective for the face recognition. The dimension reduction processing is executed using a transformation matrix decided in advance by learning using known Principal Component Analysis, Locality Preserving Projection, or the like. Note that the transformation matrix is that of base vectors which specify a feature vector space after the dimension reduction processing. Using the transformation matrix, a feature vector including an array of feature amounts is projected from an original feature vector space onto a feature vector space specified by the base vectors. Assume that the transformation matrix is stored as data or a part of a program in the ROM 105 or data storage unit 102, and is loaded onto the RAM 106 prior to the face recognition processing. The CPU 104 executes the dimension reduction processing with reference to the transformation matrix loaded onto the RAM 106.

In the pattern identification processing such as the face recognition processing, when a pixel pattern of face image data has varied due to a change in illumination condition, a change in posture of an identification target, and the like, the identification accuracy drops. For example, in the face recognition processing, when registered face image data and input face image data have a difference between face directions, or a difference between facial expressions, the identification accuracy drops. In this case, it is known that the identification accuracy drop is reduced using only a partial region of a face with a small variation with respect to a change in face direction or the like in the face recognition. In this embodiment, such partial region of a face will be referred to as "local region" hereinafter. The local region is normally a region, a position and size of which are decided based on the aforementioned organ detection result, and the face recognition processing normally uses several ten to several hundred local regions. Note that the following two methods can be used to generate a feature vector of a local region.

In the first method, required local regions are extracted in turn from face image data, and feature amounts are extracted for respective local regions. However, in general, local regions often overlap each other, and this method unwantedly calculates a feature amount of an identical region a plurality of times, resulting in a long processing time.

In the second method, feature amounts for entire face image data are temporarily calculated, and required local regions are extracted from the calculated feature amounts. Unlike in the first method, a feature amount of an identical region is prevented from being calculated a plurality of times, thus shortening a processing time. However, in order to implement this method, of all the calculated feature amounts, at least those of all regions including local regions have to be stored in a memory, thus increasing a required memory size.

However, since a requirement for a shorter processing time is generally high, the pattern identification processing such as the face recognition processing use the second method of the aforementioned two methods in one embodiment. On the other hand, when this method is used, a predetermined number of feature amounts are required to be stored in the memory so as to store the feature amounts, as descried above. For this reason, in order to suppress cost of the signal processing apparatus 100, a data size of each individual feature amount can be reduced as much as possible. For this reason, the dimension reduction processing of feature amounts as vector data is executed in step S203.

In step S204, the CPU 104 executes identification processing using feature amounts after the dimension reduction processing calculated in step S203. In this embodiment, the feature vector after the dimension reduction processing will be referred to as a projection vector hereinafter. Projection vectors are generated as many as the number of local regions. In step S204, the CPU 104 collates between the projection vectors of the respective local regions of the face image data and those of respective local regions of registered data.

The registered data means data including a registered vector and a person ID corresponding to the registered vector. Note that the person ID is an identifier required to identify a person corresponding to the registered vector, and is expressed by, for example, an integer value. More specifically, values such as 0, 1, 2, . . . are set as person IDs in an order of registration. Note that character string data such as a name or nickname may be associated with the person ID. The registered data are stored in the data storage unit 102, and are loaded onto the RAM 106 prior to the face recognition processing. Note that registered data generation processing will be described later.

In the identification processing in step S204, a person ID of the input face data is decided based on similarities between the projected vectors and registered vectors and a threshold designated in advance. Note that a similarity will be explained as a Euclidean distance between feature vectors on the feature vector space after the dimension reduction processing. In this case, as the distance is smaller, the projection vector and registered vector are interpreted as similar vectors. Hence, the registered vector having a smaller distance (face image data as a basis of that registered vector) is similar to the input face image data. For this reason, the identification processing of step S204 is executed in the following sequence.

Initially, distances between a projection vector and all registered vectors are calculated, and the registered vectors are sorted in ascending order of distance. Next, the distance (minimum distance) between the projection vector and the top registered vector after sorting is compared with a pre-set threshold. If the minimum distance is not more than the threshold, a person of the input face image data corresponds to a person indicated by an ID of the top registered vector after sorting, and the input face image data is stored in association with the ID of the registered vector. On the other hand if the minimum distance is larger than the threshold, it is determined that a person of the input face image data is not registered. In this case, an ID value corresponding to a non-registered person, which is determined in advance by the signal processing apparatus 100, is stored in association with the input face image data.

Note that registered vectors are generated using a plurality of face image data for a single person, and an integration result of similarities between these registered vectors and a projection vector may be used in identification. For example, in a registration mode, registered vectors are respectively generated for a plurality of face image data associated with a single person, and an identical person ID is assigned to these registered vectors (for that person). In an identification mode, after the registered vectors are sorted based on distances between a projection vector and the registered vectors, all registered vectors having distances which are not more than the threshold are extracted, and a person ID corresponding to the highest frequency of the extracted person IDs is determined as the person ID of the input face image data. Alternatively, average values of distances for respective extracted person IDs are calculated, and a person ID having a minimum distance average value is determined as that of the input face image data.

In step S205, the CPU 104 stores the person ID obtained in step S204 in association with the face image data stored in the RAM 106.

Figure 3:
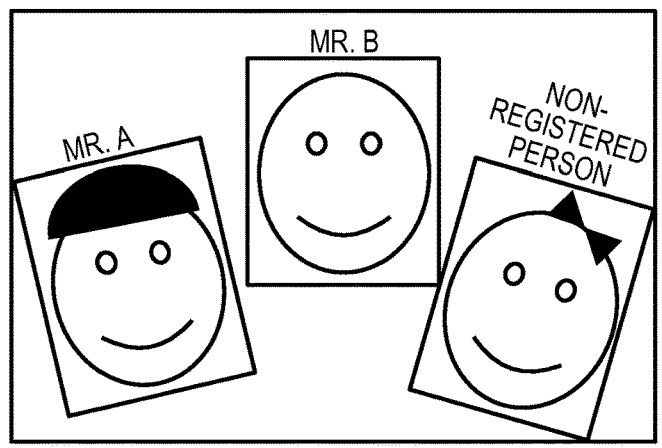
FIG. 3 is a view showing an example of a face recognition result image.

The aforementioned face recognition processing is executed one by one for all face image data detected from input image data. Upon completion of the face recognition processing for all the face image data, a recognition result is output. As an example of the recognition result output, for example, a face recognition result image may be generated based on the registered data stored in the RAM 106, position/size information of face image data, and the person ID of the face image data, and may be displayed on the display unit 107. FIG. 3 shows an example of the face recognition result image. In the example shown in FIG. 3, each face region is displayed in a rectangular frame, and a person ID of that face region or associated character string is displayed above that frame.

As another output method, a method of storing the position/size information, person ID, and the like of the face image data in the data storage unit 102 in association with the registered data may be used. Alternatively, these pieces of information may be transmitted to an external apparatus (not shown) via the communication unit 103 in place of being stored in the data storage unit 102.

Note that the output processing is executed upon completion of the processing for all the face image data. Alternatively, the output processing may be executed every time the face recognition processing is complete for each face image data.

Note that in this embodiment, in step S201, the face image data is converted to have a predetermined size so that the two eyes in the face image data are arranged horizontally. In order to improve the identification accuracy, the face image data can be converted in this way. However, depending on system requirements or the like, for example, while a slight identification accuracy drop is allowed, improvement of a processing speed and resource reductions are often required to be achieved. Therefore, the face image data conversion processing in step S201 may be omitted.

<3. Overview of Feature Amount Extraction Processing>

Figure 4:
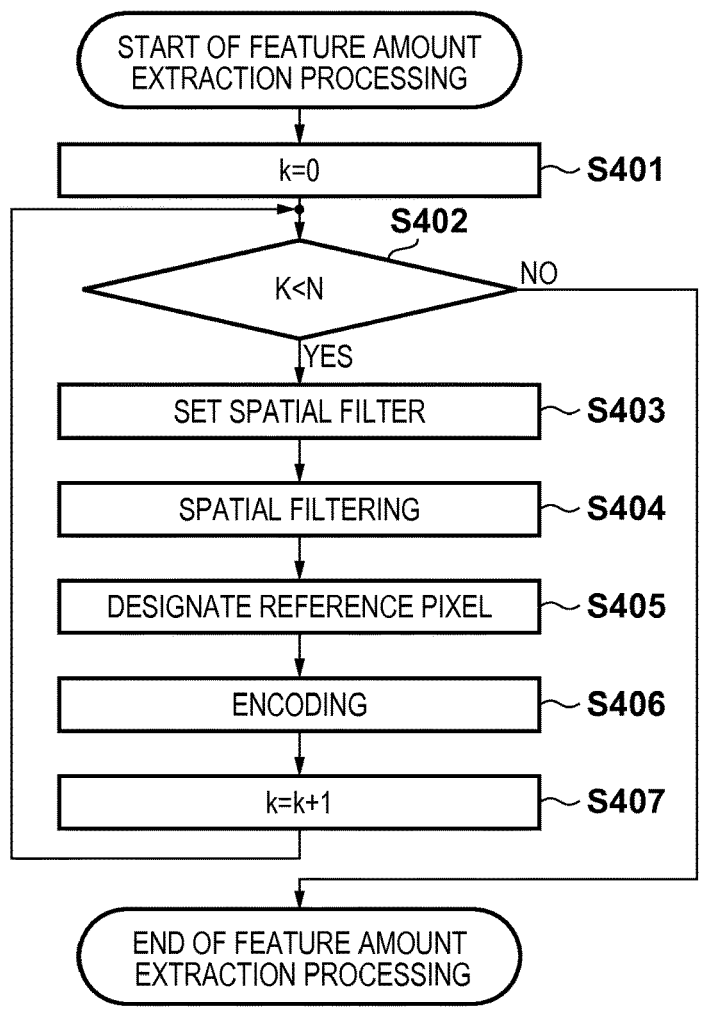
FIG. 4 is a flowchart showing feature amount extraction processing.

FIG. 4 is a flowchart showing the sequence of the feature amount extraction processing in step S202. The sequence of the feature amount extraction processing will be described below with reference to FIG. 4.

In the feature amount extraction processing of this embodiment, spatial filtering is applied to face image data using spatial filters having biased frequency responses. Then, spatial filtering result data (filtering result) is encoded to generate encoded result data. In this embodiment, N (N≥1) spatial filter coefficients are stored in the RAM 106, and are sequentially applied to face image data. Alternatively, the spatial filter coefficients may be stored in the data storage unit 102 or ROM 105. In this case, the spatial filter coefficients are applied after they are temporarily loaded onto the RAM 106.

Figure 5:
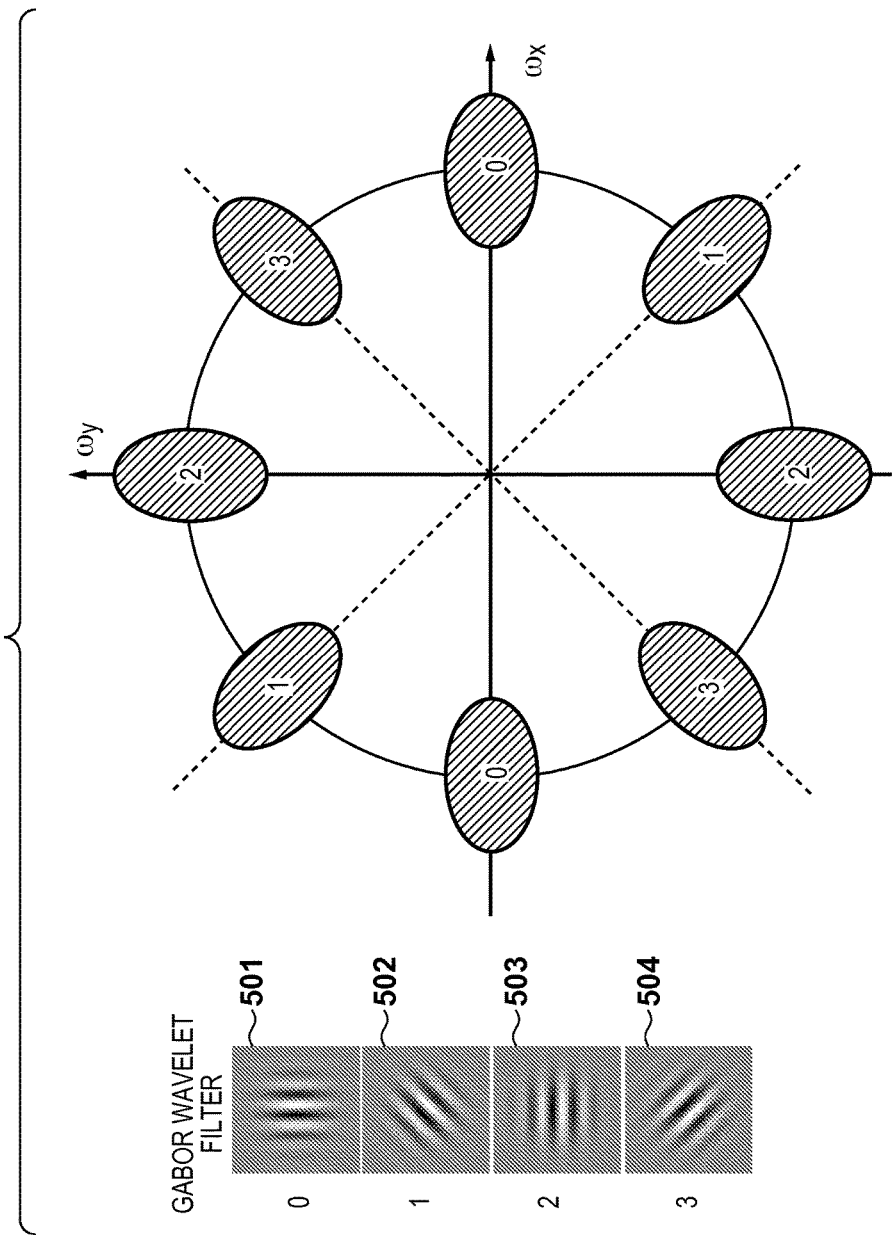
FIG. 5 is a view showing frequency responses of Gabor Wavelet filters.

In this embodiment, as an example of the spatial filters having biased frequency responses, Gabor Wavelet filters are used. The Gabor Wavelet filter is a spatial filter which can extract specific frequency components included in image data. FIG. 5 shows the frequency responses of the respective Gabor Wavelet filters. Coefficients of Gabor Wavelet filters 501 to 504 assume positive values in white portions and negative values in black portions. As shown in FIG. 5, the Gabor Wavelet filters can extract frequency components in different directions according to their shapes. In this embodiment, using such characteristics, relative positions of reference pixels with respect to a pixel of interest used in subsequent encoding are changed according to directions of frequency components to be extracted by the respective Gabor Wavelet filters. Note that this embodiment uses the Gabor Wavelet filters as the example of the spatial filters having biased frequency responses. However, any other spatial filters may be used as long as they have biased frequency responses. As other examples of the spatial filters having biased frequency responses, Steerable filters, Sobel filters, and the like may be used.

In step S401, the CPU 104 initializes an index k to k=0. Note that the index k is used to select a spatial filter to be loaded from the RAM 106 in step S403.

The CPU 104 determines in step S402 whether or not processing of all the spatial filters is complete for face image data. In this embodiment, the CPU 104 determines based on whether or not k<N holds. If k<N does not hold, the CPU 104 determines that processing of all the spatial filters is complete, and ends the processing based on the flowchart shown in FIG. 4. On the other hand, if k<N holds, the CPU 104 determines that spatial filters to be used still remain, and the process advances to steps S403 to S407.

Figure 6:
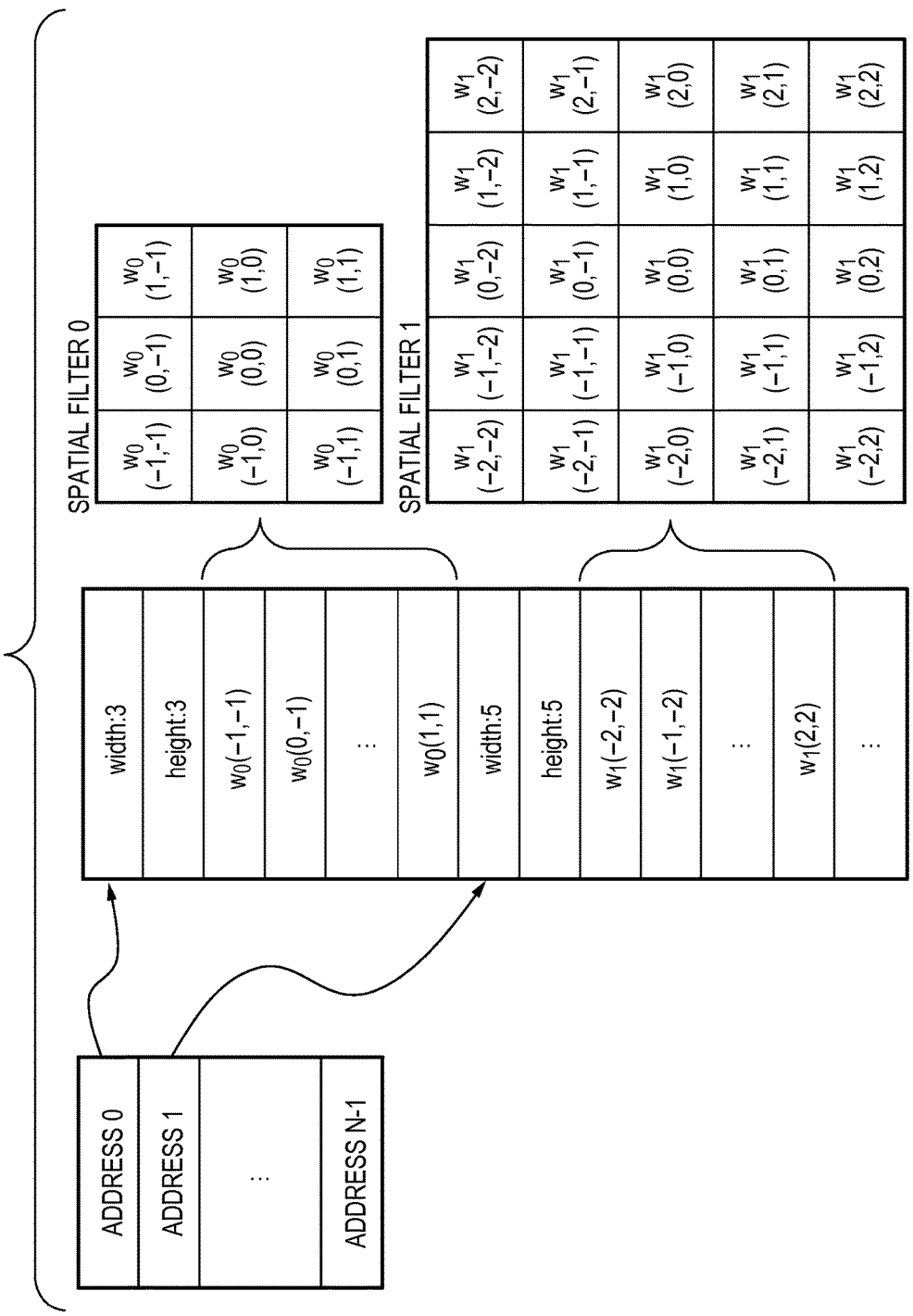
FIG. 6 is a view for explaining a storage method of spatial filters in a memory.

In step S403, the CPU 104 loads the k-th spatial filter used in step S404 from the RAM 106. FIG. 6 shows a storage method of the spatial filters in the RAM 106. In this embodiment, sizes and coefficients of the N spatial filters are stored in the RAM 106 as a one-dimensional array in turn from k=0th. Also, a one-directional array of N start addresses of coefficients of the k-th spatial filter, which are arranged in turn, is stored in the RAM 106. Assume that in this embodiment, the spatial filter to be used is determined in advance. For this reason, N is a predetermined constant. A plurality of spatial filters having different frequency responses may be used.

The k-th spatial filter is loaded from the RAM 106 as follows. A "width" and "height" of the spatial filter, which are stored in turn from the position of a start address k, are loaded first. Next, spatial filter coefficients are loaded in turn from a position next to the "height" based on "width" and "height" values. Then, spatial filter coefficients are loaded in turn from a position next to the "height" based on the "width" and "height" values, thus generating a two-dimensional spatial filter having a size of "width"×"height".

Note that the storage method of the spatial filters in the RAM 106 is not limited to that shown in FIG. 6, and an arbitrary method can be used as long as spatial filters are stored in a format in which the CPU 104 can identify sizes and coefficients of respective spatial filters.

In step S404, the CPU 104 executes spatial filtering using the spatial filter set in step S403. Spatial filtering at coordinates (x, y) is expressed by:

$$o(x, y) = \sum_{r=-height/2}^{height/2} \sum_{c=-width/2}^{width/2} i(x+c, y+r) \cdot w(c, r) \quad (4)$$

where i(x, y): an input pixel value at the coordinates (x, y),
o(x, y): a filtering result at the coordinates (x, y),
w(c, r): a spatial filter coefficient at coordinates (x+c, y+r),
width: the width of the spatial filter, and
height: the height of the spatial filter.

Note that an upper left point of face image data is defined as an origin, a horizontal direction defines x coordinates, and a vertical direction defines y coordinates.

Figure 7:
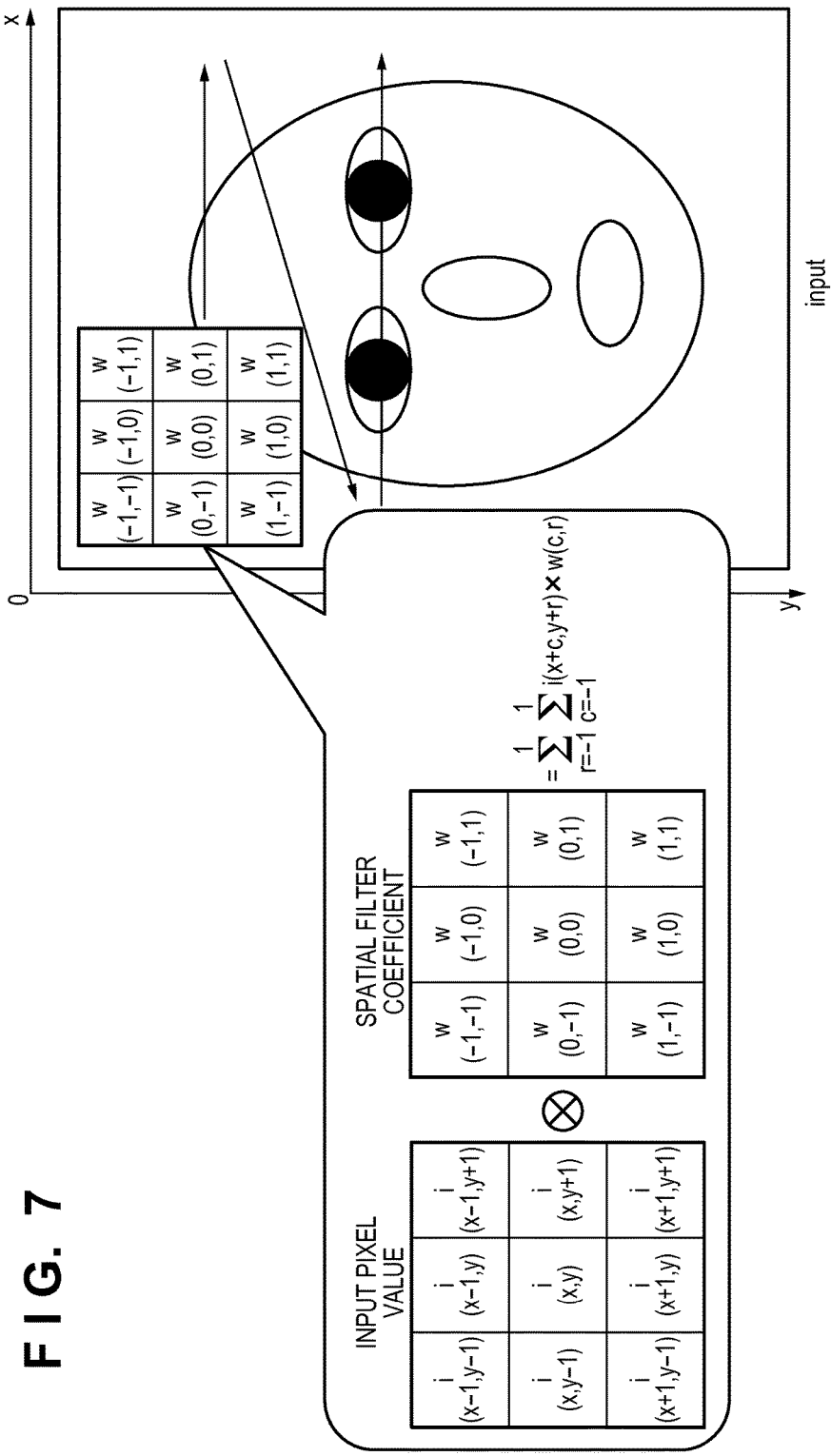
FIG. 7 is a view showing an overview of spatial filtering.

FIG. 7 shows an overview of processing when the spatial filtering is executed for face image data. As shown in FIG. 7, the calculation of equation (4) is executed at respective coordinates while being shifted one by one in x and y directions for entire face image data, thereby obtaining a filtering result for the entire face image data.

In step S405, the CPU 104 designates relative positions of reference pixels with respect to a pixel of interest, which are used in step S406.

As described above, when an LBP is applied to encoding processing, a data amount of generated encoding result data becomes large. As a result, an internal memory size required to store feature amounts increases, thus increasing cost of the signal processing apparatus. When an increment sign is applied to encoding processing, a data amount of generated encoding result data is reduced to ⅛ of the LBP, but pattern identification performance is lower than the LBP, as described above.

Based on the above problems, in order to prevent any identification accuracy drop of pattern identification after the number of reference pixels is limited, reference pixels from which information effective for pattern identification can be extracted are required to be used. Especially, when image data after application of the spatial filters such as Gabor Wavelet filters, which can extract specific frequency components, undergoes incremental encoding, reference pixels from which effective information can be extracted may be different depending on frequency responses.

Hence, in the encoding processing of this embodiment, relative positions of reference pixels with respect to a pixel of interest, which are used in the calculation of an increment sign, are switched according to the frequency response of a spatial filter. Thus, compared to the conventional increment sign which uses reference pixels at fixed positions, the identification accuracy of pattern identification can be expected to be improved.

In order to execute encoding processing using different reference pixels according to spatial filters, in this embodiment, a correspondence relationship between spatial filter numbers and reference pixels is stored in advance in the RAM 106 as a table. Alternatively, such table is stored in the data storage unit 102 or ROM 105, and is used after that table is temporarily loaded onto the RAM 106. FIG. 8 shows a correspondence table showing the correspondence relationship between the spatial filter numbers and reference pixels. In the processing of step S405, the CPU 104 loads, from the RAM 106, a relative position $(x_k, y_k)$ of a reference pixel with respect to a pixel of interest, which position is decided based on the number of a spatial filter indicated by the index k.

In this embodiment, the relative position $(x_k, y_k)$ of a reference pixel with respect to a pixel of interest is changed according to the frequency responses of the Gabor Wavelet filters. Especially, based on a bias of the frequency responses of the Gabor Wavelet filters, a pixel in a principal component direction of the frequency response is selected as a reference pixel. A pixel to be selected as a reference pixel can be determined in advance for each Gabor Wavelet filter to be applied. FIG. 9 shows an example of the relationship between the principal component directions of the frequency responses of the Gabor Wavelet filters and relative positions of reference pixels with respect to a pixel of interest. In FIG. 9, a double-headed arrow on each Gabor Wavelet filter expresses a principal component direction of frequency components to be extracted by that Gabor Wavelet filter.

In step S406, the CPU 104 executes encoding processing for the filtering result using the reference pixel at the relative position loaded in step S405. The encoding processing of this embodiment is expressed by:

$$AIS_k(x,y) = s(i_k(x+x_k, y+y_k) - i_k(x,y)) \quad (5)$$

where $i_k(x, y)$: the k-th filtering result at coordinates $(x, y)$,
$AIS_k(x, y)$: encoding result data at the coordinates $(x, y)$,
$(x_k, y_k)$: a relative position of a reference pixel with respect to a pixel of interest for the k-th spatial filter, and
s(u) is the function given by equation (2).

Since the relative position of the reference pixel used in the calculation of an increment sign is switched according to the frequency responses of the spatial filters, information more effective for identification can be extracted compared to the conventional increment sign using reference pixels at fixed positions. For this reason, a feature amount effective for pattern identification such as face recognition can be expected to be extracted. In fact, when face recognition tests were conducted using the signal processing method of this embodiment, it was confirmed that the identification accuracy was improved by 10% compared to the conventional increment sign.

In step S407, the CPU 104 increments the index k to use the next spatial filter, and the process returns to step S402.

Note that in this embodiment, the feature amount extraction processing is executed while switching the N spatial filters one by one. Alternatively, processes for all or some spatial filters may be parallelly executed.

This embodiment has explained the encoding processing which encodes to two values based on the magnitude relationship between one pixel of interest and one reference pixel. However, the embodiments are not limited to this, and encoding processing may be executed like following (a) to (e).

(a) Encoding processing for executing encoding using P (P≥1) reference pixels in an order closer to a first principal component direction of frequency components extracted by a spatial filter A j-th principal component direction is a direction including the j-th largest number of frequency components of principal component directions of frequency components to be extracted by the spatial filter. Increment signs for the P reference pixels are calculated, are multiplied by weighting coefficients, and are then added up. The weighting coefficients assume larger values as signs have positional relationships each between the reference pixel used and the pixel of interest, which are closer to the first principal component direction.

(b) Encoding processing for encoding using reference pixels closest to principal component directions for first to Q-th principal component directions (Q≥1) of frequency components to be extracted by a spatial filter Increment signs for Q reference pixels are calculated, are multiplied by weighting coefficients, and are then added up. The weighting coefficients assume larger values in an order of signs having the positional relationships each between the reference pixel used and the pixel of interest, which are closest to the first principal component direction, the second principal component direction, . . . .

(c) Encoding processing for executing encoding using an average value of pixel values in an n×n region In place of a pixel value of one pixel, an average value of pixel values in the n×n region is used. A reference pixel having a relationship between the central positions of the pixel of interest and the reference pixel, which is closest to a principal component direction of frequency components to be extracted by the spatial filter, is used.

(d) Encoding processing for executing encoding using an absolute value of a difference between pixel values of a pixel of interest and reference pixel Encoding is executed using an absolute value of a difference between pixel values in place of the magnitude relationship. The function s(u) in equation (2) can be replaced by a function $s_{abs}(u)$ given by:

$$s_{abs}(u) = \begin{cases} 1 & \text{if } |u| \geq th \\ 0 & \text{if } |u| < th \end{cases} \quad (6)$$

(e) Encoding processing for encoding to three values or more

Using a plurality of thresholds, encoding to three values or more is executed. For example, upon execution of encoding to three values, the function s(u) in equation (2) can be replaced by a function $s_3(u)$ using two thresholds, as given by:

$$s_3(u) = \begin{cases} 2 & \text{if } u \geq th0 \\ 1 & \text{if } th1 \leq u < th0 \\ 0 & \text{if } u < th1 \end{cases} \quad (7)$$

Figure 10B:
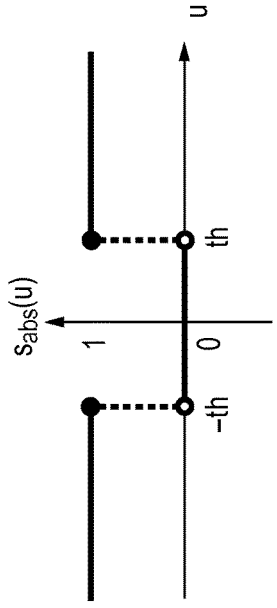
FIGS. 10A to 10C are graphs showing modifications of an input/output relationship of an encoding method.
Figure 10A:
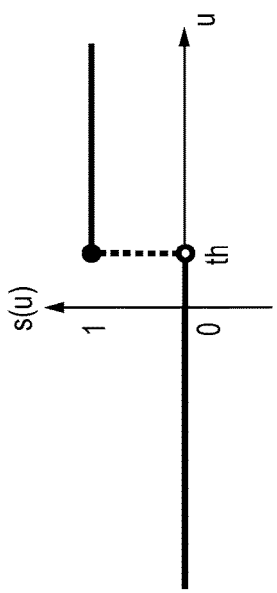
Figure 10C:
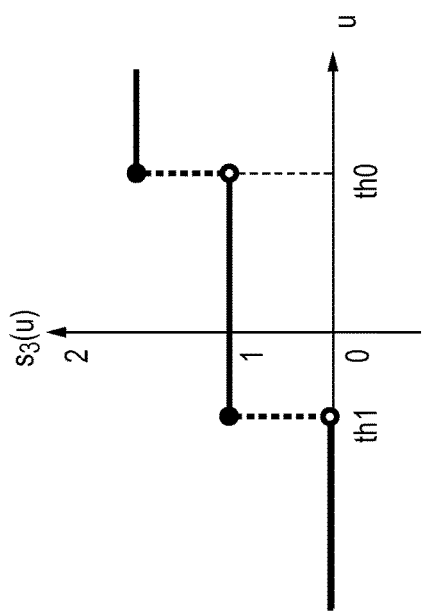

FIGS. 10A, 10B, and 10C show graphs of the functions given by equations (2), (6), and (7). In addition, encoding may be executed based on a ratio between pixel values of the pixel of interest and reference pixel. Also, encoding may be executed by combining a plurality of the aforementioned methods. For example, processing for encoding to three values using an average value of pixels in the n×n region in place of a pixel value according to equation (7) may be used.

<4. Overview of Registered Data Generation Processing>

Figure 11:
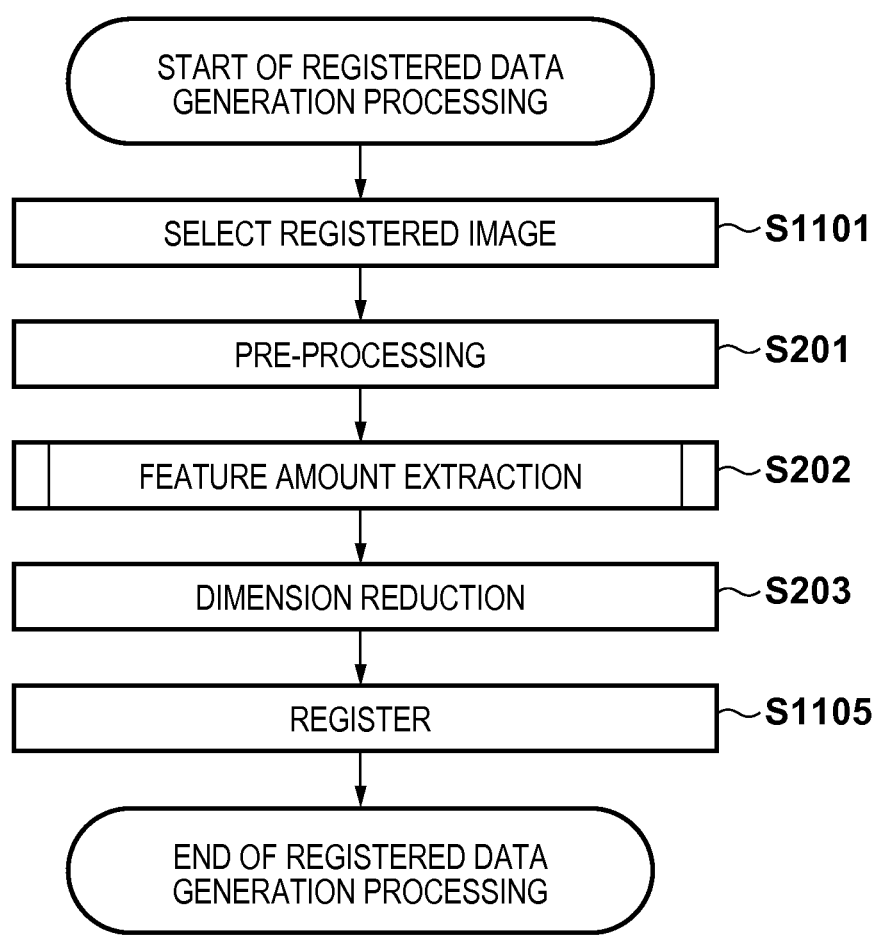
FIG. 11 is a flowchart showing registered data generation processing.

Next, the registered data generation processing will be described below. Registered data is data including a registered vector and a person ID corresponding to the registered vector. FIG. 11 is a flowchart showing the sequence of the registered data generation processing. Note that the same step numbers of steps in FIG. 11 denote the same steps as in FIG. 2, and a description thereof will not be repeated.

In step S1101, the CPU 104 selects face image data to be used to generate registered data. Initially, the CPU 104 stores image data stored in the data storage unit 102 in the RAM 106. Then, the CPU 104 extracts face regions from the image data stored in the RAM 106 by a known face detection method, and displays image data including the detected face regions indicated by rectangular frame on the display unit 107. The user selects a face region to be registered from those face regions via the input unit 101. The CPU 104 resizes image data of the selected face region to a predetermined size, and stores the resized data in the RAM 106 as face image data. If there is no face region to be registered, the user inputs an instruction to display next image data.

Via steps S201 to S203, the CPU 104 generates feature amounts after the dimension reduction processing from the selected face image data. The CPU 104 stores the generated feature amounts in the RAM 106 as a registered vector.

In step S1105, the CPU 104 stores the registered vector and person ID in the data storage unit 102 in association with each other. Note that the sequence for associating the registered vector and person ID with each other is as follows.

Initially, the CPU 104 displays person IDs or character string data associated with the person IDs, which have already been stored in the data storage unit 102, on the display unit 107. Next, the user designates the person ID or character string data, which may correspond to the face image data selected in step S1101, via the input unit 101. Then, the CPU 104 stores the designated person ID in the data storage unit 102 in association with the registered vector. On the other hand, when neither the corresponding person ID nor character string data are stored, the user inputs information that advises accordingly via the input unit 101. In this case, the CPU 104 stores a new person ID in the data storage unit 102 in association with the registered vector.

Note that this embodiment has explained the case in which the person IDs or character string data are displayed on the display unit 107. However, the embodiments are not limited to this. For example, face image data may be stored in the data storage unit 102 in combination with registered data, and the face image data may be displayed on the display unit 107 together with the person IDs or character string data.

Note that the pattern identification processing described using FIG. 2 requires only the registered vector output by the registered data generation processing described using FIG. 11. Therefore, the registered data generation processing need only be executed prior to the pattern identification processing to obtain the registered vector, and the pattern identification processing and registered data generation processing need not always be executed by a single apparatus.

As can be seen from the above description, the signal processing method according to this embodiment applies a plurality of types of spatial filters having biased frequency responses to input face image data in the face recognition processing. Then, encoding processing based on a comparison result between pixel values of a pixel of interest and reference pixel is executed for the face image data to which the spatial filters are applied, thus extracting feature amounts. In this case, encoding is executed while switching the relative position of the reference pixel according to the principal component direction of frequency components to be extracted by the applied spatial filter. In this manner, feature amounts which have a data amount smaller than that obtained by the known LBP encoding, and the identification accuracy of pattern identification higher than the known incremental encoding can be extracted.

This brings about an effect of an efficient reduction of a memory size required to store feature amounts extracted in this embodiment. Furthermore, this brings about an effect of a cost reduction of a predetermined apparatus when the encoding processing of this embodiment is carried out in that apparatus.

Second Embodiment

The second embodiment of the present invention will be described below with focus on differences from the first embodiment.

In the first embodiment described above, encoding is executed while switching a relative position of a reference pixel to be used with respect to a pixel of interest according to a principal component direction of frequency components to be extracted by a spatial filter. By contrast, this embodiment will explain an arrangement in which a relative position of a reference pixel to be used in encoding with respect to a pixel of interest is decided by machine learning.

In order to decide a relative position of a reference pixel with respect to a pixel of interest by machine learning, learning data have to be prepared in advance. In this embodiment, face image data already set with correct person IDs are prepared as learning data. Each of the face image data has already been converted to have a predetermined size so that the two eyes are arranged horizontally by the same processing as in step S201. In order to prevent overlearning, the face image data include various pixel pattern variations in association with face directions in pan and tilt directions, facial expressions, illumination conditions, and the like, in one embodiment. The prepared learning data are classified into a group used to generate registered data, and a group used as input image data.

In this embodiment, a plurality of relative position candidates of a reference pixel are prepared in advance, and a relative position of the reference pixel is decided from the plurality of candidates with respect to each spatial filter, so as to improve the identification accuracy of pattern identification with respect to the learning data. The relative position candidates include, for example, eight pixels which neighbor a pixel of interest. The sequence for deciding a relative position of a reference pixel for each spatial filter will be described below.

Initially, identification accuracy upon execution of pattern identification using the first spatial filter and first relative position candidate of a reference pixel is calculated. For this purpose, a transformation matrix used in the dimension reduction processing in step S203 is generated first. The transformation matrix is generated for feature amounts extracted using the first spatial filter and first relative position candidate of the reference pixel for all learning data. More specifically, the transformation matrix is generated by applying known Principal Component Analysis, Locality Preserving Projection, or the like. Using the generated transformation matrix, registered data are generated according to the sequence shown in FIG. 11, and pattern identification processing is executed, thus calculating the identification accuracy.

Next, the relative position of the reference pixel is changed to the second candidate, and the identification accuracy of pattern identification is calculated according to the same sequence. Likewise, identification accuracies of pattern identification are calculated for all the candidate, and a candidate corresponding to the highest identification accuracy of pattern identification is selected as a relative position of the reference pixel with respect to the pixel of interest for the first spatial filter.

Subsequently, the second spatial filter is added, and a relative position of a reference pixel with respect to the pixel of interest is decided for the second spatial filter according to the same sequence as above so as to obtain the highest identification accuracy upon execution of pattern identification using the two spatial filters.

The aforementioned sequence is repeated until all spatial filters are added, thereby determining relative positions of reference pixels to be used in encoding for the respective spatial filters.

With the aforementioned sequence, the relative positions of the reference pixels with respect to the pixel of interest are decided for the respective spatial filters using all the learning data. Note that in addition to the aforementioned sequence, a relative position of a reference pixel with respect to the pixel of interest may be decided for a new spatial filter based on the concept of Boosting (see Japanese Patent Laid-Open No. 8-329031) to be described below. More specifically, a candidate which can correctly identify learning data which was erroneously identified so far may be selected as the relative position of the reference pixel with respect to the pixel of interest.

Note that the Boosting is a method of adding a discriminator whose identification accuracy is not so high one by one, and finally generating a discriminator whose identification accuracy is high. The Boosting is characterized in that weights are set for learning data, and when a discriminator is added, a discriminator having the highest identification accuracy for learning data which are stochastically selected based on the weights. The weights are updated every time a discriminator is added. That is, a weight for erroneously identified learning data is increased, and that for correctly identified learning data is decreased. Since learning is executed while selecting learning data with larger weights, a newly added discriminator, which can correctly identify learning data erroneously identified by discriminators used so far, tends to be selected. Note that as an initial value of a weight, the same value is set for all the learning data.

With this method, initially, for the first spatial filter, pattern identification is executed for all learning data using the first spatial filter and respective candidates in the same manner as in the aforementioned sequence. Then, identification accuracies of pattern identification are calculated, and a candidate corresponding to the highest identification accuracy is selected as the relative position of the reference pixel with respect to the pixel of interest for the first spatial filter.

Then, weights of erroneously identified learning data are increased, and those of correctly identified learning data are decreased.

Next, based on the updated weights of the learning data, those which are used to decide a relative position of a reference pixel for the second spatial filter are selected. Then, pattern identification is executed for the selected learning data using the second spatial filter and respective candidates. Then, identification accuracies of pattern identification are calculated, and a candidate corresponding to the highest identification accuracy is selected as the relative position of the reference pixel with respect to the pixel of interest for the second spatial filter. In this case, since many learning data which were erroneously identified when the first spatial filter was used are selected, the candidate which can correctly identify these learning data is selected as the relative position of the reference pixel with respect to the pixel of interest for the second spatial filter.

The aforementioned sequence is repeated until all spatial filters are added, and the relative positions of the reference pixels with respect to the pixel of interest, which are used in encoding, are decided for the respective spatial filters.

A correspondence relationship between the relative positions of the reference pixels with respect to the pixel of interest and the spatial filters, which are decided by one of the aforementioned sequences, is stored in a data storage unit 102 or ROM 105 as a corresponding table having a format shown in FIG. 8 when a signal processing apparatus 100 shown in FIG. 1 is designed. Then, in a registered data generation mode in the first embodiment, and a pattern identification mode, encoding processing is executed using the correspondence table loaded from the data storage unit 102 or ROM 105 onto a RAM 106.

Note that in this embodiment, only one relative position of the reference pixel to be used in encoding with respect to the pixel of interest is selected from the candidates which are prepared in advance for each spatial filter. However, the embodiments are not limited to this, and a plurality of reference positions may be selected from the candidates. In this case, R (R≥1) candidates are selected in, for example, descending order of identification accuracy of pattern identification processing.

As can be seen from the above description, the signal processing method according to this embodiment decides, by machine learning, a relative position of a reference pixel to be used in encoding with respect to a pixel of interest for each spatial filter. That is, in the first embodiment, each reference position is decided based on the frequency response of the spatial filter, but it is automatically decided by machine learning in this embodiment.

As a result, according to this embodiment, the shapes and orders of the spatial filters used in the feature amount extraction processing are decided, and a relative position of a reference pixel for each spatial filter can be optimized by machine learning so as to obtain the highest identification accuracy of pattern identification. That is, this embodiment is applicable to spatial filters other than spatial filters such as Gabor Wavelet filters for which appropriate relative positions of reference pixels can be decided based on the frequency responses. Note that such spatial filters include, for example, those, the shapes of which are decided by machine learning.

Third Embodiment

The third embodiment of the present invention will be described below with focus on differences from the first embodiment. In the first embodiment, the signal processing apparatus is implemented by the arrangement shown in FIG. 1. However, the embodiments are not limited to this, and the signal processing apparatus may be implemented by another arrangement.

Figure 12:
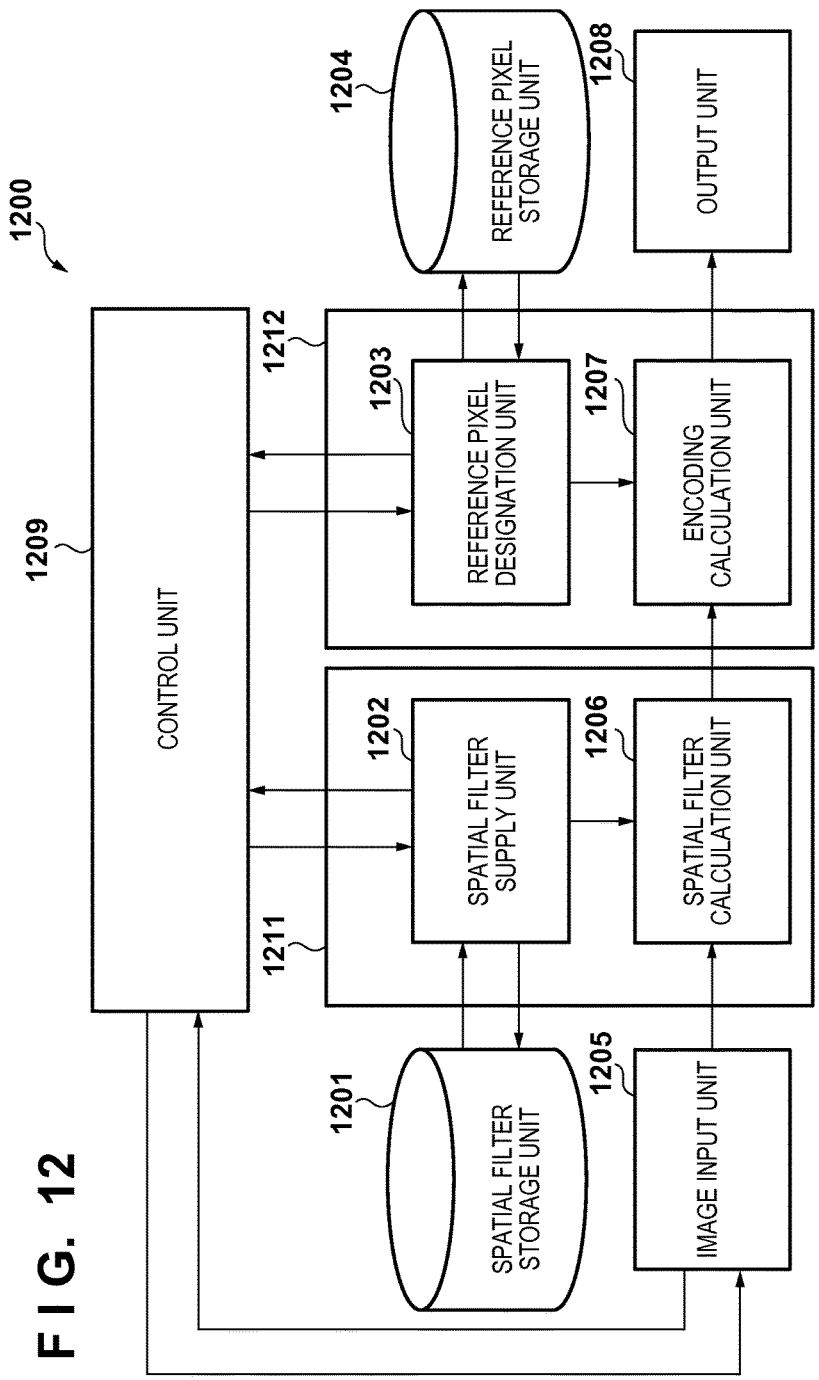
FIG. 12 is a block diagram showing an example of the arrangement of a signal processing apparatus according to the third embodiment.

FIG. 12 is a block diagram showing the arrangement of a signal processing apparatus 1200 according to this embodiment. Referring to FIG. 12, a spatial filter storage unit 1201 is a memory, which stores spatial filters used by a spatial filter calculation unit 1206, and includes a known ROM, RAM, register, or the like. Assume that the spatial filter storage unit 1201 stores, for example, N (N≥1) spatial filters in the format described using FIG. 6 in the first embodiment.

A reference pixel storage unit 1204 is a memory, which stores relative positions of reference pixels with respect to a pixel of interest, which are used by an encoding calculation unit 1207, and includes a known ROM, RAM, register, or the like. Assume that the reference pixel storage unit 1204 stores, for example, N relative positions of reference pixels as many as the number of spatial filters in the format of FIG. 8 in the first embodiment.

In this embodiment, in order to execute encoding processing using the reference pixels with respect to the pixel of interest at the relative positions predetermined for the respective spatial filters, identifiers are set for the spatial filters stored in the spatial filter storage unit 1201. Also, identifiers are set for the relative positions of the reference pixels with respect to the pixel of interest, which are stored in the reference pixel storage unit 1204. Note that in this embodiment, integer values ranging from 0 to N−1 are set as the identifiers in an order of storage in the spatial filter storage unit 1201. Also, the same identifiers as the corresponding spatial filters are set for the relative positions of the reference pixels with respect to the pixel of interest.

A control unit 1209 controls the operation of the signal processing apparatus 1200. The control unit 1209 holds an internal counter used to repetitive count in an order of 0 to N−1, and repeats processing to be described below.

The control unit 1209 transmits a current count number to a spatial filter supply unit 1202 and reference pixel designation unit 1203. Next, upon reception of signals indicating completion of loading of the spatial filter and the relative position of the reference pixel with respect to the pixel of interest from the spatial filter supply unit 1202 and reference pixel designation unit 1203, the control unit 1209 transmits a signal which instructs to input image data to an image input unit 1205. Note that when the count value is other than 0, the control unit 1209 instructs to input the same input image data as the previous data; only when the count value is 0, it instructs to input the next input image data. This is because spatial filtering is executed using the N different spatial filters for the identical input image data. Upon reception of a signal indicating completion of input of the input image data from the image input unit 1205, the control unit 1209 updates the counter, and transmits the updated count number to the spatial filter supply unit 1202 and reference pixel designation unit 1203.

Upon reception of the signal from the control unit 1209, which instructs to acquire the input image data, the image input unit 1205 begins to acquire the input image data. For example, when the signal processing apparatus 1200 is applied to face recognition, the image input unit 1205 acquires face image data. As in the first embodiment, this face image data is image data obtained by detecting a face region from 8-bit unsigned luminance image data using a known face detection method, and converting the detected face region to have a predetermined size so that the two eyes are arranged horizontally. The face image data is stored in, for example, a RAM (not shown) connected to the signal processing apparatus 1200, and the image input unit 1205 loads the face image data from that RAM. Upon completion of input of the face image data, the image input unit 1205 transmits a signal indicating completion of input to the control unit 1209.

Reference numeral 1211 denotes a spatial filtering unit, which includes the spatial filter supply unit 1202 and spatial filter calculation unit 1206 in this embodiment.

The spatial filter supply unit 1202 loads the spatial filter set with the same identifier as the count number received from the control unit 1209 from the spatial filter storage unit 1201, and transmits the loaded filter to the spatial filter calculation unit 1206. Upon completion of transmission of the spatial filter, the spatial filter supply unit 1202 transmits the signal indicating completion to the control unit 1209.

Note that transmission of the spatial filter means that of coefficients and size information of the spatial filter. For example, in case of this embodiment, as exemplified in FIG. 6, pieces of information of "width" and "height" of the spatial filter are transmitted as size information together with the coefficients of the spatial filter.

The spatial filter calculation unit 1206 executes spatial filtering for the face image data input from the image input unit 1205 using the spatial filter input from the spatial filter supply unit 1202, and outputs face image data as a processing result to the encoding calculation unit 1207. The operation of the spatial filter calculation unit 1206 will be described in detail below.

In this embodiment, the input image data is face image data converted to have a predetermined size, as described above. Therefore, since the size of the input image data is constant, information associated with the size of the input image data is set in advance in a register (not shown) or the like.

The spatial filter calculation unit 1206 stands by until the coefficients and size information of the spatial filter are received from the spatial filter supply unit 1202, and starts the next processing upon reception of the spatial filter. The spatial filter calculation unit 1206 stores the received spatial filter in a register or the like. Next, the spatial filter calculation unit 1206 calculates a size of image data as a processing result of spatial filtering based on the size of the input image data and that of the spatial filter, and transmits the calculation result to the encoding calculation unit 1207. Then, the spatial filter calculation unit 1206 executes spatial filtering for the input image data received from the image input unit 1205. Since the spatial filtering to be executed in this case is the same as that described in step S404 of FIG. 4 in the first embodiment, a description thereof will not be repeated. Upon completion of the spatial filtering for the input image data of the size stored in the register or the like, the spatial filter calculation unit 1206 is set in a reception waiting state from the spatial filter supply unit 1202 so as to receive the next spatial filter.

Reference numeral 1212 denotes an encoding processing unit, which includes the reference pixel designation unit 1203 and encoding calculation unit 1207 in this embodiment.

The reference pixel designation unit 1203 loads the relative position of the reference pixel with respect to the pixel of interest, which position is set with the same identifier as the count number received from the control unit 1209, from the reference position storage unit 1204, and transmits that relative position to the encoding calculation unit 1207. Upon completion of transmission, the reference pixel designation unit 1203 transmits a signal indicating completion to the control unit 1209.

The encoding calculation unit 1207 executes encoding processing for the image data as the processing result of the spatial filtering using, as a reference pixel, a pixel at the relative position input from the reference pixel designation unit 1203, and transmits encoding result data to an output unit 1208. The operation of the encoding calculation unit 1207 will be described in detail below.

The encoding calculation unit 1207 stands by until it receives the relative position of the reference pixel with respect to the pixel of interest and the size of the filtering result from the reference pixel designation unit 1203 and spatial filter calculation unit 1206, and starts the next processing upon reception of them. Initially, the encoding calculation unit 1207 stores the relative position of the reference pixel with respect to the pixel of interest and the size of the filtering result in a register or the like. Then, the encoding calculation unit 1207 executes encoding processing for the image data received from the spatial filter calculation unit 1206 using the reference pixel at the position stored in the register or the like. Since the encoding processing is the same as that described in step S406 of FIG. 4 in the first embodiment, a description thereof will not be repeated. Upon completion of the encoding processing for the filtering result stored in the register or the like, the encoding calculation unit 1207 stands by until it receives the next relative position of the reference pixel with respect to the pixel of interest, and the size of the filtering result.

The output unit 1208 outputs the encoding result data. The output unit 1208 outputs the encoding result data to a RAM (not shown) or another signal processing apparatus connected to the signal processing apparatus 1200 according to this embodiment.

Note that when the signal processing apparatus 1200 is applied to face recognition processing, circuits for executing dimension reduction processing and identification processing using the encoding result data output from the signal processing apparatus 1200 as feature amounts are further connected.

As can be seen from the above description, the signal processing apparatus 1200 according to this embodiment executes spatial filtering for identical input image data while switching the N different spatial filters in the order from 0 to N−1. Also, the signal processing apparatus 1200 executes encoding processing for the filtering result while switching the relative positions of the reference pixels in the order from 0 to N−1 in synchronism with switching of the spatial filters. By setting the same identifier for the spatial filter and the corresponding relative position of the reference pixel with respect to the pixel of interest, the encoding processing can be executed using the reference pixel at the predetermined relative position for each spatial filter.

Note that this embodiment adopts the arrangement in which the control unit 1209 holds the internal counter used to repetitively count in the order from 0 to N−1, and transmits the current count number. However, any other arrangements may be adopted as long as a repetitive number is transmitted in an order designated in advance.

Fourth Embodiment

Figure 13:
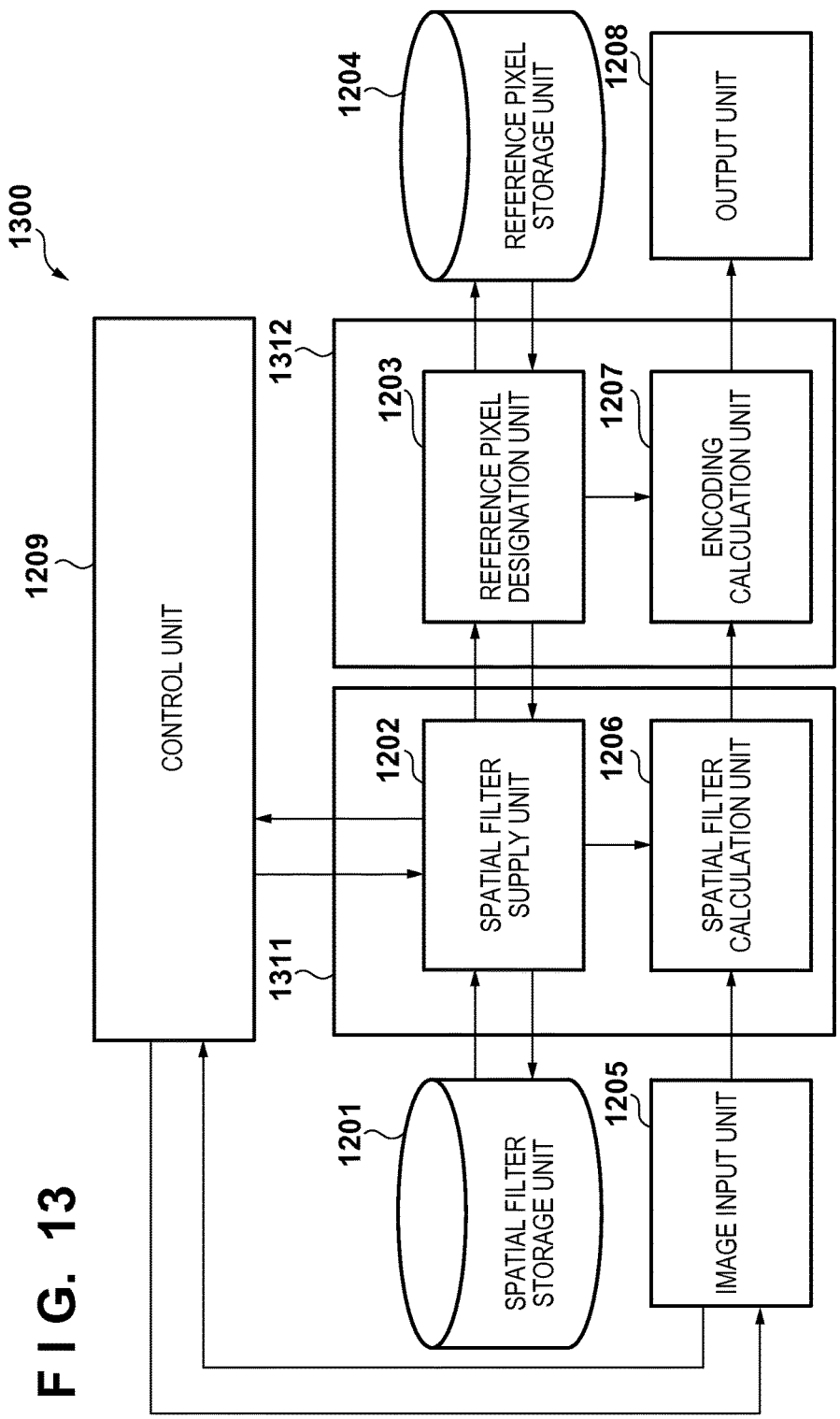
FIG. 13 is a block diagram showing an example of the arrangement of a signal processing apparatus according to the fourth embodiment.
Figure 14:
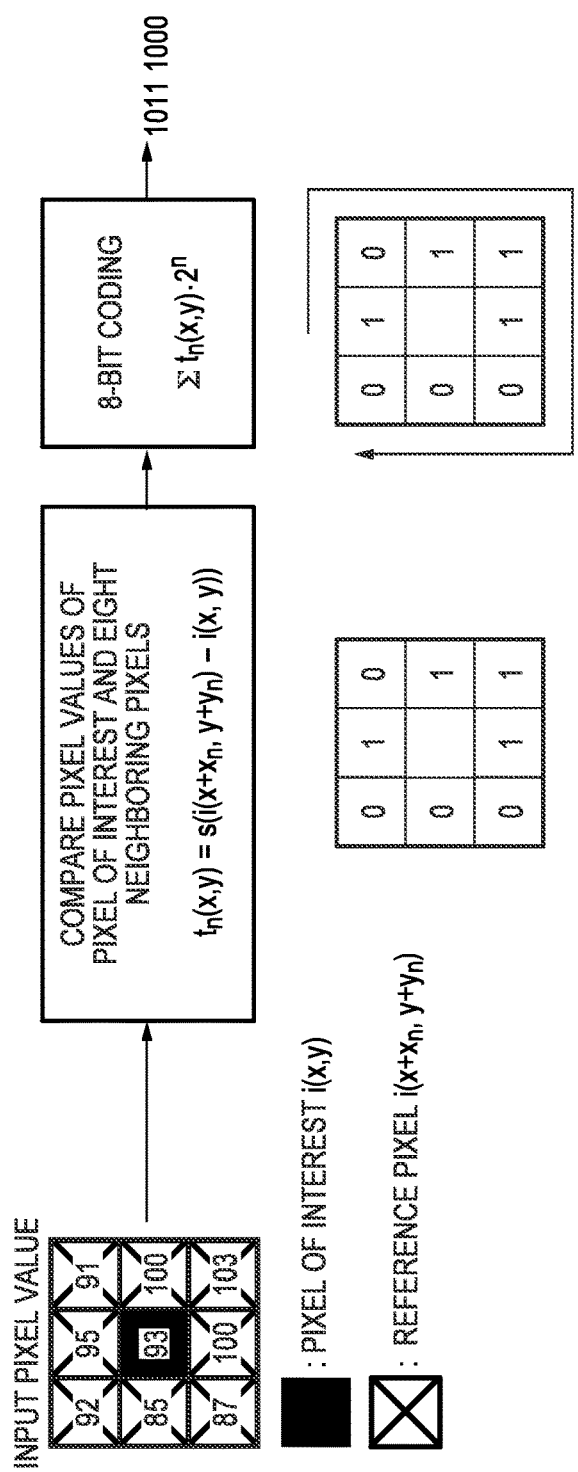
FIG. 14 is a view for explaining processing for extracting an LBP from an input pixel value.

The fourth embodiment will be described below. FIG. 13 is a block diagram showing the arrangement of a signal processing apparatus 1300 according to this embodiment. The arrangement example shown in FIG. 13 will be described below with focus on differences from that shown in FIG. 12.

In the arrangement example shown in FIG. 13, a control unit 1209 transmits a count number to only a spatial filter supply unit 1202.

The spatial filter supply unit 1202 loads a spatial filter set with the same identifier as the count number received from the control unit 1209 from a spatial filter storage unit 1201, and transmits the identifier of the loaded spatial filter to a reference pixel designation unit 1203.

The reference pixel designation unit 1203 loads a relative position of the identifier received from the spatial filter supply unit 1202 from a reference pixel storage unit 1204. The reference pixel designation unit 1203 transmits the loaded relative position to an encoding calculation unit 1207, and also transmits a signal indicating completion of transmission to the spatial filter supply unit 1202.

Note that in the arrangement example shown in FIG. 13, the control unit 1209 and spatial filter supply unit 1202 are included as independent processing blocks. However, the embodiments are not limited to this. For example, the spatial filter supply unit 1202 and spatial filter calculation unit 1206 may be integrated into one processing block.

In FIGS. 12 and 13, both the spatial filter storage unit 1201 and reference pixel storage unit 1204 are included in the single signal processing apparatus 1200 or 1300. However, the embodiments are not limited to this. For example, an external RAM or the like, which is connected to the signal processing apparatus 1200 or 1300, may be used as the spatial filter storage unit 1201 or reference pixel storage unit 1204.

The first embodiment has explained the arrangement example suited to software processing mainly using the versatile CPU using FIG. 1, while FIG. 12 or 13 shows the arrangement example suited to signal processing using dedicated hardware. In this manner, by adopting the arrangement for executing signal processing by dedicated hardware, the respective processing blocks can be operated at the same time, thus speeding up the signal processing compared to the arrangement example described in the first embodiment.

Fifth Embodiment

The first to fourth embodiments have explained the case in which the signal processing method according to the embodiments is applied to two-dimensional image data as multi-dimensional data. Also, the signal processing method according to embodiments are applicable to data of three dimensions or more. Upon application to D-dimensional data (D≥3), D-dimensional spatial filters are prepared, and D-dimensional spatial filtering is executed. Then, encoding processing is executed for the D-dimensional filtering result using a reference pixel at a D-dimensional relative position, which is set in advance for each spatial filter. A relative position of a reference pixel with respect to a pixel of interest is decided according to the frequency response of the D-dimensional spatial filter, as described in the first embodiment, or is decided by machine learning, as described in the second embodiment.

A case will be explained below wherein the signal processing method of the embodiments are applied to three-dimensional image data as an example of data of three dimensions or more.

The three-dimensional image data is a set of pixels having three-dimensional coordinates (x, y, z). Encoding for a three-dimensional filtering result obtained upon application of a three-dimensional spatial filter is expressed by:

$$AIS3_k(x,y,z)=s(i_k(x+x_k,y+y_k,z+z_k)-i_k(x,y,z)) \quad (8)$$

where $i_k(x, y, z)$: the k-th filtering result at coordinates (x, y, z), $AIS3_k(x, y, z)$: encoding result data at the coordinates (x, y, z), and $(x_k, y_k, z_k)$: a relative position of a reference pixel with respect to a pixel of interest for the k-th spatial filter.

The case of D=3 has been explained, and the embodiments are easily applicable to a case of D≥4.

Note that this embodiment has explained the case in which the filtering result is encoded. However, the embodiments are not limited to this. A relative position of a reference pixel with respect to a pixel of interest may be decided in advance in correspondence with characteristics of processing before encoding processing in place of spatial filtering, and encoding processing is executed using that reference pixel.

Other Embodiments

Embodiments of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-183587, filed Aug. 22, 2012, which is hereby incorporated by reference herein in its entirety.

What is claimed is:

1. An image processing method for extracting feature amounts from an image for performing face or pattern recognition, comprising:
    sequentially selecting one of a plurality of spatial filters with different frequency responses;
    generating a plurality of filtered images by performing spatial filtering on the image using the sequentially selected one of the spatial filters;
    switching from a pixel position to another pixel position to set a relative position of a reference pixel with respect to a pixel of interest in response to selecting one of the spatial filters, according to a frequency response of the selected one of the spatial filters, wherein a pixel value at the reference pixel is to be used for encoding a pixel value at the pixel of interest of each filtered image;
    creating vectors by encoding each of the plurality of filtered images using the pixel value at the pixel of interest of each filtered image and the pixel value at the reference pixel of that filtered image, the reference pixel being located at the set relative position with respect to the pixel of interest; and
    performing face or pattern recognition using the plurality of encoded images by comparing the created vectors with vectors of images stored in a memory.

2. The method according to claim 1, wherein in the selection step, a plurality of spatial filters are selected, and
    in the generating step, the filtered image is generated by respectively applying the plurality of selected spatial filters to the image.

3. The method according to claim 1, wherein the selected one of the spatial filters has a biased frequency response.

4. The method according to claim 3, wherein the relative position of the reference pixel includes P (P≥1) relative positions, wherein a direction to the relative position is closer to a first principal component direction of frequency components extracted by the selected one of the spatial filters than the other relative positions.

5. The method according to claim 3, wherein the relative position of the reference pixel includes relative positions of Q (Q≥1) reference pixels, wherein the Q reference pixels include from a first reference pixel to a Q-th reference pixel, a direction from the pixel of interest to the first reference pixel being closer to a first principal component direction of frequency components extracted by the selected one of the spatial filters than the other reference pixels, a direction from the pixel of interest to the Q-th reference pixel being closer to a Q-th principal component direction of frequency components extracted by the selected one of the spatial filters than the other reference pixels.

6. The method according to claim 1, wherein the relative position of the reference pixel is selected by learning to enhance an identification accuracy of pattern identification for multi-dimensional data.

7. The method according to claim 6, wherein in the learning, an identification accuracy upon execution of pattern identification processing for the multi-dimensional data using the encoding result data output when a candidate selected one by one from a plurality of candidates is used as the reference pixel is calculated, and relative positions of R (R≥1) candidates selected in descending order of identification accuracy are used as the relative position of the reference pixel for the selected one of the spatial filters.

8. The method according to claim 7, wherein in the learning, the reference position of the relative pixel is sequentially decided for the plurality of spatial filters, and
    upon decision of the relative position of the reference pixel for a new spatial filter, relative positions of R (R≥1) candidates, which are selected in descending order of identification accuracy of pattern identification processing when the encoding result data output using the spatial filter, the relative position of the reference pixel of which has already been decided, is combined, are used as the relative positions of the reference pixels for the new spatial filter.

9. The method according to claim 1, wherein the relative position is a central position of the reference pixel relative to a central position of the pixel of interest.

10. The method according to claim 1, wherein in the encoding step, the filtered images are encoded based on a magnitude relationship between the pixel value at the pixel of interest and the pixel value at the reference pixel.

11. The method according to claim 1, wherein in the encoding step, the filtered images are encoded based on an absolute value of a difference between the pixel value at the pixel of interest and the pixel value at the reference pixel.

12. The method according to claim 1, wherein in the encoding step, the filtered images are encoded based on a ratio between the pixel value at the pixel of interest and the pixel value at the reference pixel.

13. The method according to claim 1, wherein the pixel value at the pixel of interest and the pixel value at the reference pixel are respectively an average pixel value of the pixel of interest, and an average pixel value of the reference pixel.

14. The method according to claim 1, wherein switching the relative position of the reference pixel is performed according to a frequency response of the selected one of the spatial filters.

15. The method according to claim 14, wherein the relative position of the reference pixel is predetermined for each of the plurality of spatial filters, or wherein a direction from the pixel of interest to the reference pixel is predetermined for each of the plurality of spatial filters.

16. The method according to claim 1, wherein the frequency response of the selected spatial filter includes a direction of a frequency component extracted by the spatial filter.

17. An image processing apparatus for extracting feature amounts from an image for performing face or pattern recognition, comprising:
at least one processor functioning as:
a selection unit configured to sequentially select one of a plurality of spatial filters with different frequency responses;
a generating unit configured to generate a plurality of filtered images by performing spatial filtering on the image using the sequentially selected one of the spatial filters;
a switching unit configured to switch from a pixel position to another pixel position to set a relative position of a reference pixel with respect to a pixel of interest in response to selecting one of the spatial filters, according to a frequency response of the selected one of the spatial filters, wherein a pixel value at the reference pixel is to be used for encoding a pixel value at the pixel of interest of each filtered image;
an encoding unit configured to create vectors to encode each of the plurality of filtered images using the pixel value at the pixel of interest of each filtered image and the pixel value at the reference pixel of that filtered image, the reference pixel being located at the set relative position with respect to the pixel of interest; and
a recognition unit configured to perform face or pattern recognition using the plurality of encoded images by comparing the created vectors to vectors of images stored in a memory.

18. The apparatus according to claim 17, further comprising:
at least one memory functioning as:
a spatial filter storage unit configured to hold information related to a plurality of spatial filters; and
a reference pixel storage unit configured to store relative positions of a plurality of reference pixels,
wherein said spatial filtering unit is further configured to load information related to the selected one of the spatial filters from said spatial filter storage unit,
said encoding unit is further configured to load the relative position of the reference pixel corresponding to the selected one of the spatial filters loaded by said spatial filtering unit from said reference pixel storage unit, and
said encoding unit is further configured to encode the filtered image output by applying the selected one of the spatial filters loaded by said generating unit, using the loaded relative position of the reference pixel.

19. The apparatus according to claim 18, wherein said encoding unit is further configured to set an identical identifier for the selected one of the spatial filters and the relative position of the reference pixel corresponding to that spatial filter and to transmit the identical identifier to said spatial filtering unit,
said generating unit is further configured to load information related to a spatial filter corresponding to the identifier from said spatial filter storage unit, and
said encoding processing unit is further configured to load the relative position of the reference pixel corresponding to the identifier from said reference pixel storage unit.

20. A non-transitory computer-readable storage medium storing a program to instruct a computer to perform an image processing method for extracting feature amounts from an image for performing face or pattern recognition, comprising:
sequentially selecting one of a plurality of spatial filters with different frequency responses;
generating a plurality of filtered images by performing spatial filtering on the image using the sequentially selected one of the spatial filters;
switching from a pixel position to another pixel position to set a relative position of a reference pixel with respect to a pixel of interest in response to selecting one of the spatial filters, according to a frequency response of the selected one of the spatial filters, wherein a pixel value at the reference pixel is to be used for encoding a pixel value at the pixel of interest of each of the plurality of filtered images;
creating vectors by encoding each of the plurality of filtered images using the pixel value at the pixel of interest of each filtered image and the pixel value at the reference pixel of that filtered image, the reference pixel being located at the set relative position with respect to the pixel of interest; and
performing face or pattern recognition using the plurality of encoded images by comparing the created vectors with vectors of images stored in a memory.

* * * * *